(12) United States Patent
Shirota et al.

(10) Patent No.: US 6,834,709 B2
(45) Date of Patent: *Dec. 28, 2004

(54) AUTOMOTIVE AIR CONDITIONER

(75) Inventors: Yuichi Shirota, Anjo (JP); Hisashi Tanaka, Anjo (JP); Hiroshi Nonoyama, Toyota (JP); Kazushi Shikata, Kariya (JP); Yukio Uemura, Kariya (JP); Hikaru Sugi, Nagoya (JP)

(73) Assignee: DENSO Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/816,384

(22) Filed: Mar. 26, 2001

(65) Prior Publication Data

US 2001/0017204 A1 Aug. 30, 2001

Related U.S. Application Data

(60) Division of application No. 09/531,531, filed on Mar. 21, 2000, which is a continuation of application No. 09/460,795, filed on Dec. 15, 1999, now abandoned, which is a division of application No. 09/038,902, filed on Mar. 12, 1998, now Pat. No. 6,044,656, which is a division of application No. 08/731,792, filed on Oct. 18, 1996, now Pat. No. 5,755,107, which is a continuation-in-part of application No. 08/531,383, filed on Sep. 21, 1995, now abandoned.

(30) Foreign Application Priority Data

| Sep. 22, 1994 | (JP) | 6-227592 |
|---|---|---|
| Oct. 4, 1994 | (JP) | 6-240362 |
| Aug. 29, 1995 | (JP) | 7-220903 |
| Sep. 13, 1995 | (JP) | 7-235505 |
| Oct. 18, 1995 | (JP) | 7-270148 |
| Oct. 30, 1995 | (JP) | 7-281479 |

(51) Int. Cl.[7] ............................. G60H 1/32; F25B 29/00
(52) U.S. Cl. ...................... 165/43; 165/42; 165/202; 62/244; 237/12.3 A; 237/12.3 B; 454/156; 454/160; 454/161
(58) Field of Search ........................... 165/42, 43, 202; 454/156, 160, 161; 237/12.3 A, 12.3 B; 62/244

(56) References Cited

U.S. PATENT DOCUMENTS

| 1,909,144 A | 5/1933 | Bates |
|---|---|---|
| 2,213,018 A | 8/1940 | Perkins |
| 2,295,750 A | 9/1942 | Norris et al. |
| 2,532,882 A | 12/1950 | Beatty |
| 2,552,396 A | 5/1951 | Brandecker |
| 2,703,223 A | 3/1955 | Gebhardt et al. |
| 2,735,657 A | 2/1956 | Owen |

(List continued on next page.)

FOREIGN PATENT DOCUMENTS

| DE | 3229866 | 2/1984 | |
|---|---|---|---|
| DE | 350 1451 | * 7/1986 | ............ 237/12.3 A |
| DE | 33 48 168 | 7/1989 | |

(List continued on next page.)

OTHER PUBLICATIONS

Office action dated Sep. 23, 2003 in corresponding German Application No. 195 49 695.7 with English translation.

*Primary Examiner*—John K. Ford
(74) *Attorney, Agent, or Firm*—Harness, Dickey & Pierce, PLC

(57) ABSTRACT

An automotive air conditioner includes an offset blower for blowing an air, an evaporator is centrally disposed within a dashboard and receives the air from below, and a heater approximately horizontally disposed above the evaporator. The evaporator inclines downward along the direction of the air flow. A plurality of condensed water guide plates are provided under the evaporator so as to allow a condensed water smoothly flow on the surface of each guide plate and is discharged from the evaporator through a condensed water drain pipe.

14 Claims, 37 Drawing Sheets

U.S. PATENT DOCUMENTS

| | | |
|---|---|---|
| 3,000,192 A | 9/1961 | Mullin et al. |
| 3,492,833 A | 2/1970 | Marsteller |
| 3,918,270 A | 11/1975 | Dixon et al. |
| 4,696,340 A | 9/1987 | Nagao et al. |
| 4,709,751 A | 12/1987 | Ichimaru et al. |
| 4,958,504 A | 9/1990 | Ichikawa et al. |
| 5,074,121 A | 12/1991 | Morris |
| 5,086,830 A | 2/1992 | Heinle et al. |

FOREIGN PATENT DOCUMENTS

| | | | |
|---|---|---|---|
| EP | 0169040 | | 1/1986 |
| GB | 986663 | | 3/1965 |
| JP | 56-149819 | | 4/1955 |
| JP | 56-082628 | | 7/1981 |
| JP | A-59-77918 | | 5/1984 |
| JP | 59-153614 | | 9/1984 |
| JP | 59-167318 | | 9/1984 |
| JP | 61-75305 | | 5/1986 |
| JP | 63-17107 | * | 1/1988 |
| JP | 63-38016 | | 2/1988 |
| JP | A-63-139006 | | 9/1988 |
| JP | 64-56227 | * | 3/1989 |
| JP | U-1-171708 | | 12/1989 |
| JP | 4-349016 | * | 12/1992 |
| JP | 5-003365 | | 1/1993 |
| JP | 5-85148 | * | 4/1993 |
| JP | 5-322478 | * | 12/1993 |
| JP | 6-156049 | | 6/1994 |
| NL | 166433 | | 1/1971 |

* cited by examiner

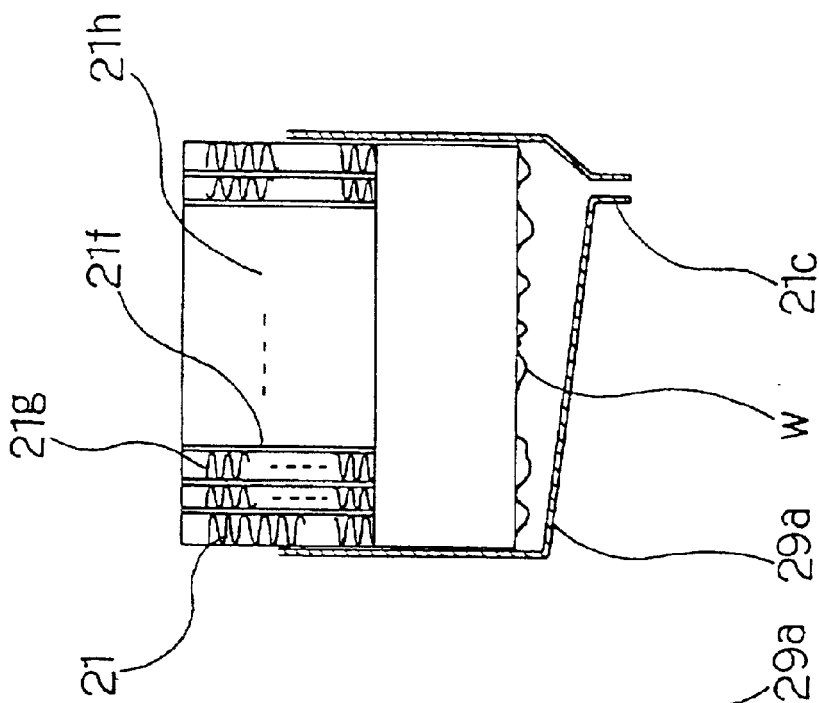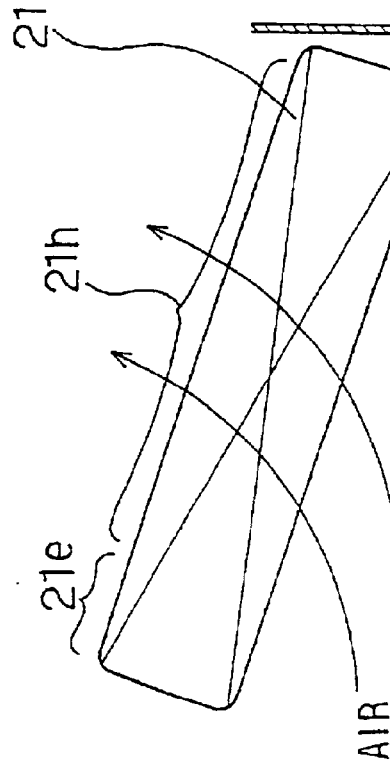

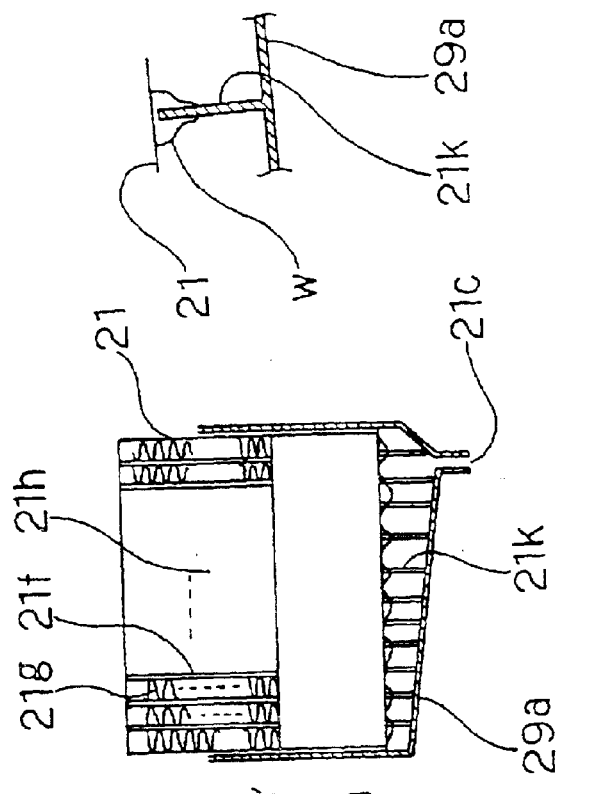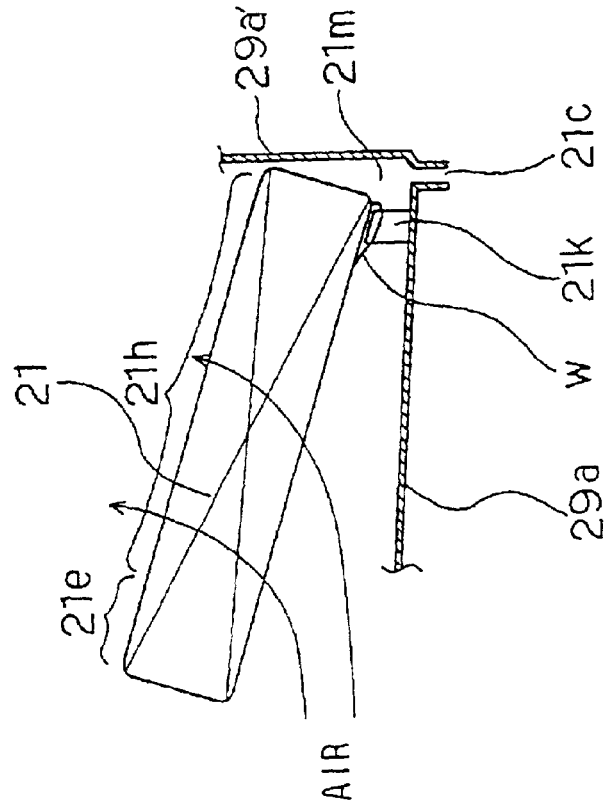

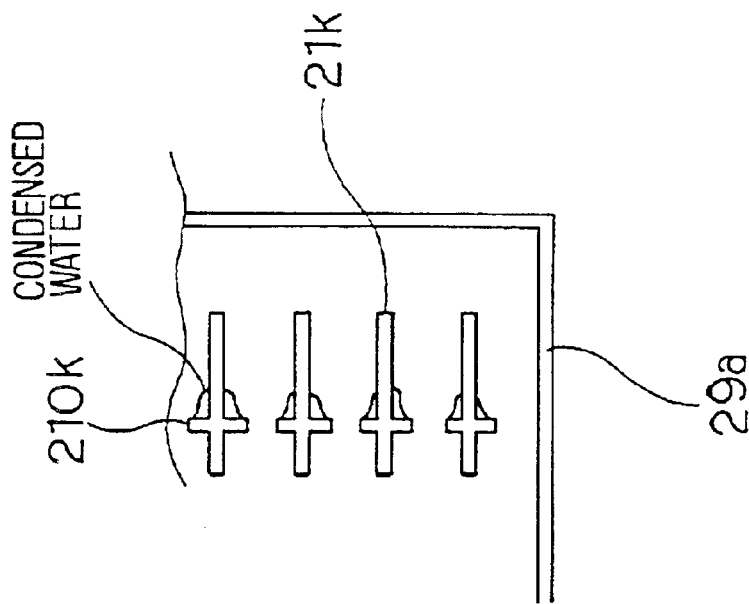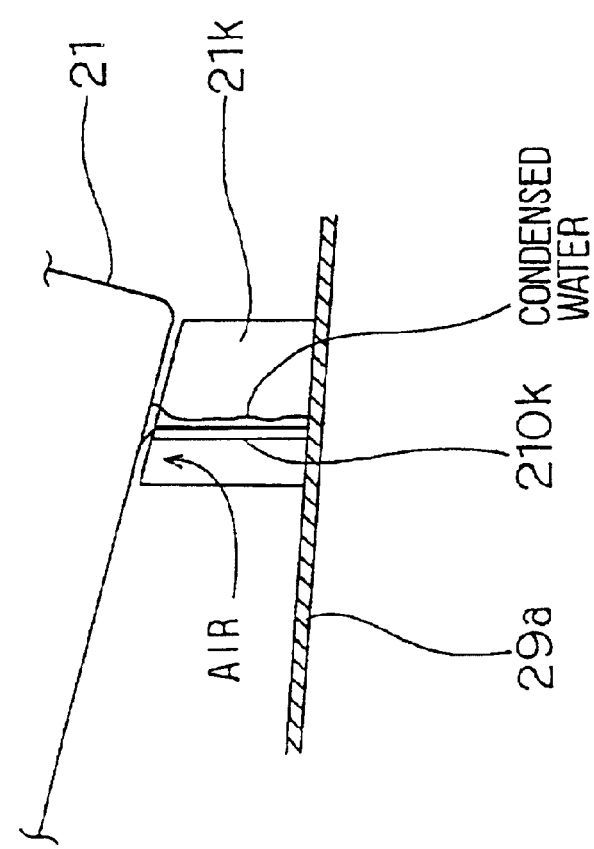

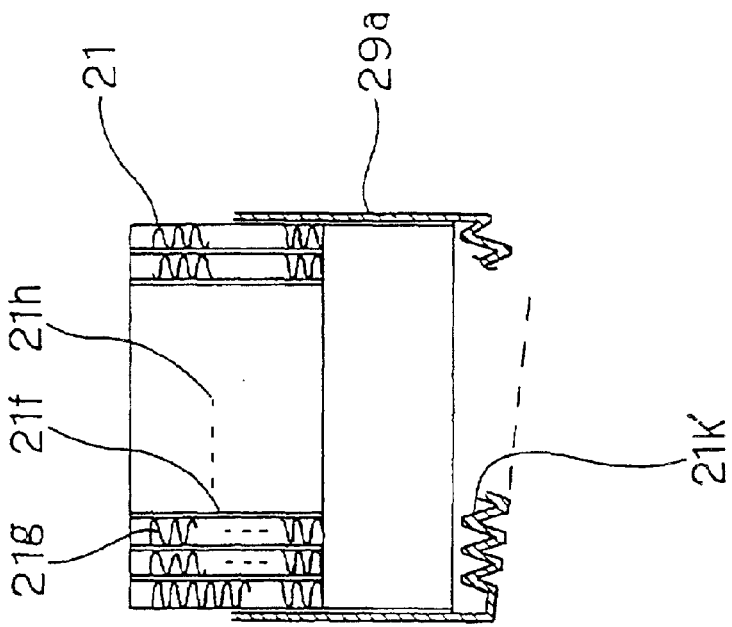
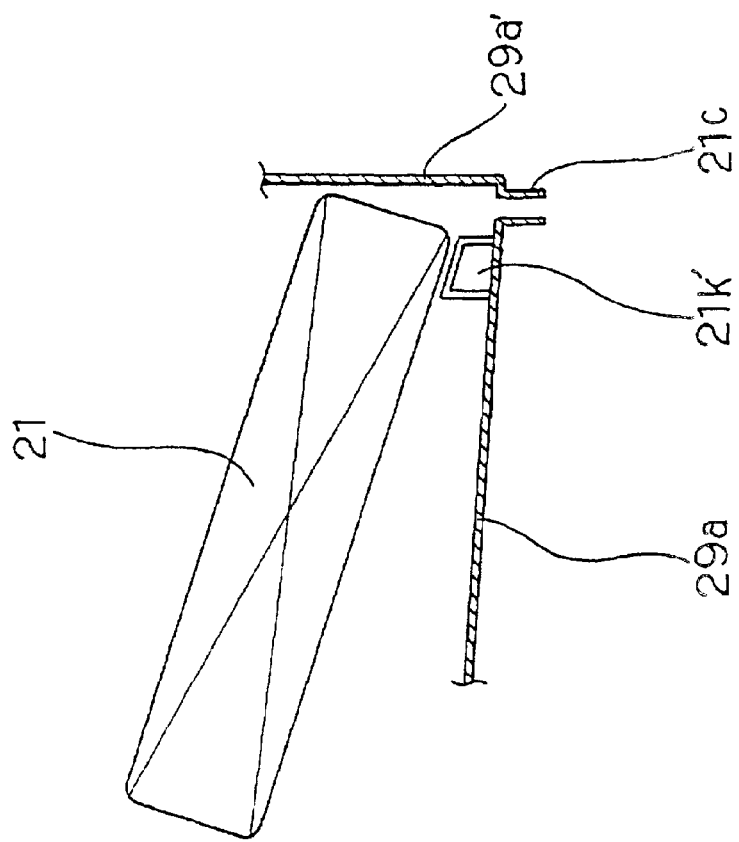

AUTOMOTIVE AIR CONDITIONER

CROSS REFERENCE TO RELATED APPLICATIONS

This application is a division of application Ser. No. 09/531,531 filed Mar. 21, 2000, which was a continuation of application Ser. No. 09/460,795 filed Dec. 15, 1999, now abandoned, which was a division of application Ser. No. 09/038,902 filed Mar. 12, 1998, now U.S. Pat. No. 6,044,656, which was a division of application Ser. No. 08/731,792 filed Oct. 18, 1996, now U.S. Pat. No. 5,755,107, which was a continuation-in-part of U.S. application Ser. No. 08/531,383 filed Sep. 21, 1995, now abandoned, and claims priority from Japanese Patent Application Nos. Hei. 6-227592 filed Sep. 22, 1994, Hei. 6-240362 filed Oct. 4, 1994, all of which are incorporated herein by reference. It is related to those applications and Japanese Patent Application Nos. Hei. 7-220903 filed on Aug. 29, 1995, Hei. 7-235505 filed on Sep. 13, 1995, Hei. 7-270148 filed on Oct. 18, 1995 and Hei. 7-281479 filed on Oct. 30, 1995, also incorporated herein by reference.

BACKGROUND OF THE INVENTION

1. Field of the Invention

The present invention relates to an automotive air conditioner, more particularly, to an arrangement for the automotive air conditioner unit having heat exchangers which is disposed in approximately horizontal direction and introduces the air generated by a blower from lower sides of the heat exchangers.

2. Description of the Related Art

Generally, a conventional automotive air conditioner adopts so called "lateral layout". This lateral layout is, as shown in FIG. 17, that a fan unit 1, a cooler unit 2a and a heater unit 2b are arranged in line in the lateral (width) direction of the vehicle.

FIG. 18 shows the manner in which the lateral layout air conditioner is mounted within the vehicle. The vehicle has an instrumental panel or dashboard P. The fan unit 1, the cooler unit 2a and the heater unit 2b collectively occupy a almost half space (which is formed in front of a passenger seat) in the dashboard P along the width direction of the vehicle.

Recently, a vehicle is provided with a great number of electronic components such as computers, a compact disk player, a passenger air bag and other automotive accessories. This results in a decrease in the space within the dashboard P and thus, makes it difficult to mount such a lateral layout air conditioner within the dashboard.

As shown in FIG. 19, there is shown another type of conventional air conditioner 2 arranged centrally within a vehicle and including, as a unit, a cooler or evaporator 21 and a heater core 22. The evaporator 21 and the heater core 22 are arranged one after the other in the longitudinal direction of the vehicle. A fan unit 1 is offset laterally from the central portion of the vehicle.

This type of arrangement is so called center layout. The center layout provides a sufficient space within the dashboard to mount the evaporator 21 and the heater core 22 since these components are both located at the center of the vehicle. However, since these heat exchangers (evaporator 21 and heater core 22) are vertically arranged one above the other in a longitudinal direction of the vehicle, it is necessary to provide an air duct in front of the evaporator 21 so as to receive an air from the fan unit 1. By the same way, it is necessary to provide another air duct behind the heater core 22 to allow an air flow from the heater core 22.

Consequently, those air ducts results in an increase in the overall length of the air conditioner.

This increase makes it difficult to mount a blow mode selector behind the heater core 22. To this end, the blow mode selector may be arranged above the heater core 22. However, this arrangement brings about an increase in the height of the air conditioner.

Thus, such a center layout air conditioner is also difficult to mount with a lot of electric components in the dashboard.

SUMMARY OF THE INVENTION

In view of the foregoing, it is an object of the present invention to provide a compact automotive air conditioner which enables mounting heat exchangers within a narrow vehicular space.

It is another object of the present invention to provide an automotive air conditioner which promotes drainage of condensation from an evaporator.

To achieve the above objects, the present invention adopted the following construction.

In one preferred mode of the present invention, an automotive air conditioner includes a blower, a cooling heat exchanger, a heating heat exchanger, and a blow mode selector.

The blower blows an air. The cooling heat exchanger is approximately horizontally disposed between a dashboard within a passenger compartment and an engine room and receives the air from its bottom side to an upward direction. The heating heat exchanger is approximately horizontally disposed over the cooling heat exchanger and heats the air. The blow mode selector is disposed downstream of the heating heat exchanger and changes the direction of the air flown after the air is heated to a controlled temperature by the heating heat exchanger.

In another preferred mode of the present invention, the blower is disposed between a dashboard within a passenger compartment and an engine room and offset in width direction of a vehicle from the center of a width of vehicle.

Preferably, the cooling heat exchanger gradually inclines downward along the direction of the air flow which is generated by the blower.

Preferably, the cooling heat exchanger is inclined at an angle of 10 to 30 degrees with respect to a horizontal plane.

Preferably, the air conditioner includes a case for directing the air from the blower to the cooling heat exchanger. The case has a condensed water drain pipe for draining condensed water at a position below an air flow end of downwardly inclined the cooling heat exchanger.

Preferably, the automotive air conditioner includes guide elements located below the cooling heat exchanger. The guide elements are substantially in contact therewith.

Preferably, the case has a concave and convex surface having step shape and extending in a width direction of the case to equal an air blow speed distribution measured by an air blow speed of the air introduced into the cooling heat exchanger at a bottom surface of the cooling heat exchanger.

Preferably, the blower includes a scroll casing disposed approximately horizontally, and the scroll casing has a winding end portion connected to an air passage below the cooling heat exchanger. Further, an air guide plate is disposed on a downstream side of the cooling heat exchanger and extends from the scroll casing along the air flow direction. In this way, the blow air by the blower from the scroll casing is guided by the air guide plate, and the air blow speed distribution in the longitudinal direction of the automobile can be uniformed. Accordingly, the uniform heat exchange can be performed in each portion of the cooling heat exchanger, thus improving the heat exchanging efficiency and contributing to the uniformity of the air blow speed distribution of the air flowing into the heating heat exchanger.

Preferably, an upper surface of the air guide plate contacts with a bottom surface of the cooling heat exchanger so that the air guide plate supports the said cooling heat exchanger.

Preferably, the air guide plate partitions an air passage below the cooling heat exchanger into plural independent passages.

Preferably, the air guide plate includes a curved portion on an end thereof on a side of a centrifugal fan of the blower, and the curved portion is bent smoothly along the air flow from the centrifugal fan.

Preferably, a unit case for containing the cooling heat exchanger is included, and the winding end portion is connected to a portion corresponding to a lower side portion of the cooling heat exchanger, of the unit case. Further, a portion leading from the winding end portion to the unit case, of the scroll casing, extends approximately parallel to a width direction of the automobile, and the air guide plate is disposed approximately parallel to a width direction of the automobile.

Preferably, a plurality of air distributing plates is disposed in a space between the cooling heat exchanger and the heating heat exchanger, for uniforming air blow speed distribution of air in the heating heat exchanger in a width direction of the automobile.

Preferably, a unit case for containing the cooling heat exchanger is included, and the unit case includes a stepped concave and convex portion on a portion thereof corresponding to a lower portion of the cooling heat exchanger, for uniforming air blow speed distribution of air flowing into the cooling heat exchanger in a width direction of the automobile.

Preferably, an air conditioning unit case for containing the cooling heat exchanger and the heating heat exchanger and for forming an air passage in which air generated by said blower passes is included, and a direction of the air passage is changed from a horizontal direction to a vertical direction toward the downstream side. Further, the cooling heat exchanger includes a plurality of tubes in which heating medium for being heat exchanged with air which is generated by said blower passes, and a corrugated fin connected between each pair of the adjacent tubes, and the corrugated fin has a fin flat surface and is provided with louvers for guiding air which is generated by said blower toward an inclination direction against the fin flat surface. The inclination direction being is so as to offset non-uniformity of air blow speed distribution of air due to the changing direction of the air passage in said air conditioning unit case.

Preferably, the inclination directions of the louvers of the corrugated fin on an upstream side and on the downstream side of said fin flat surface are reversed against each other, and the inclination direction of the louver of the corrugated fin at least on the downstream side is set so as to offset the non-uniformity of air blow speed distribution of air.

Preferably, the cooling heat exchanger inclines downward with a minute angle along the forwarding direction of the air flow which is generated by said blower, and the plurality of tubes is disposed so as to extend below said cooling heat exchanger along the blowing direction of the air flow which is generated by said blower. Further, the cooling heat exchanger includes a tank portion for distributing and receiving the heating medium against the plurality of tubes on an upper end portion thereof in the inclination direction, and the inclination direction of the louver of the corrugated fin at least on the downstream side is set so as to direct the air flow by the blower toward the tank portion.

In another preferred mode of the present invention, blower is disposed so as to be offset from a central portion of a dashboard in a width direction of an automobile, a cooling heat exchanger is approximately horizontally disposed within a dashboard, for receiving from its bottom side the air blown by the blower, cooling the air, and leading the cooled air toward an upward direction, and a heating heat exchanger is approximately horizontally disposed over the cooling heat exchanger in the central portion of a dashboard and for heating the air.

In further another preferred mode of the present invention, a blower is disposed so as to be offset from a central portion of a dashboard in a width direction of an automobile, a cooling heat exchanger is approximately horizontally disposed within a dashboard, for receiving from its bottom side the air blown by the blower, cooling the air, and leading the cooled air toward an upward direction, and a blow mode selector is disposed over the cooling heat exchanger and for changing the blowing direction of the air passing through the cooling heat exchanger.

In still another preferred mode of the present invention, a blower is disposed so as to be offset from a central portion of a dashboard in a width direction of an automobile, a heating heat exchanger is approximately horizontally disposed, for receiving the air from its bottom side the air blown by the blower, heating the air, and leading the heated air toward an upward direction, and a blow mode selector disposed over the heating heat exchanger and for changing the blowing direction of the air passing through the heating heat exchanger.

According to these preferred modes, both of the cooling heat exchanger and the heating heat exchanger are located substantially horizontally and laminated vertically (one above the other), a vertical space for the heat exchanger portion can be greatly reduced. As a result, the vertical dimension of the air conditioning unit can be made sufficiently smaller than that of the conventional center-layout unit.

Further, because the vertical dimension of the air conditioning unit can be made sufficiently small as described above, even when the blow mode selector is disposed over the heating heat exchanger, the vertical dimension of the entire air conditioning apparatus can be suppressed from increasing.

Further, because it is unnecessary to provide blowing ducts on the front and rear sides of the heat exchanger portion, the dimension in the longitudinal direction of the vehicle can also be reduced.

BRIEF DESCRIPTION OF THE DRAWINGS

The present invention will now be described with reference to the accompany drawings.

FIG. 8A is a sectional view showing the manner in which the condensate drops from the evaporator in the event that the air conditioner is provided with no guide plate;

FIG. 8B is a sectional view of the evaporator as viewed from right in FIG. 8A;

FIG. 9A is a sectional view of the evaporator associated with guide plates;

FIG. 9B is a sectional view of the evaporator as viewed from right in FIG. 9A;

FIG. 9C is a partial enlarged view of the guide plate of the evaporator shown in FIG. 9B;

FIGS. 12A and 12B are sectional and plan views, respectively showing a guide plate used in a second embodiment of the present invention;

FIGS. 15A and 15B are sectional and plan views of the air conditioner having guide plates used in a fourth embodiment of the present invention, respectively;

DETAILED DESCRIPTION OF THE PREFERRED EMBODIMENTS (Embodiment 1)

FIGS. 1 to 5 illustrate an automotive air conditioner according to a first embodiment of the present invention.

Figure 3:
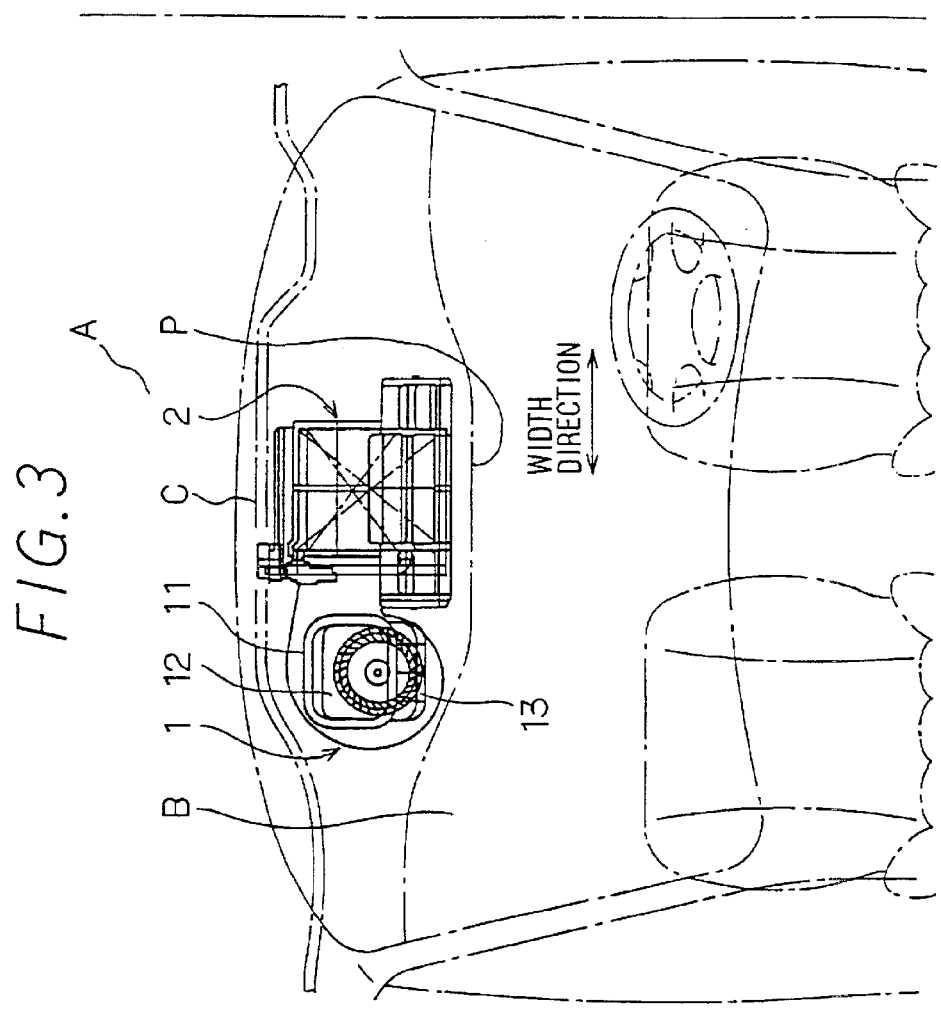
FIG. 3 is a schematic view, in plane, showing the air conditioner of the first embodiment mounted within a vehicle.
Figure 4:
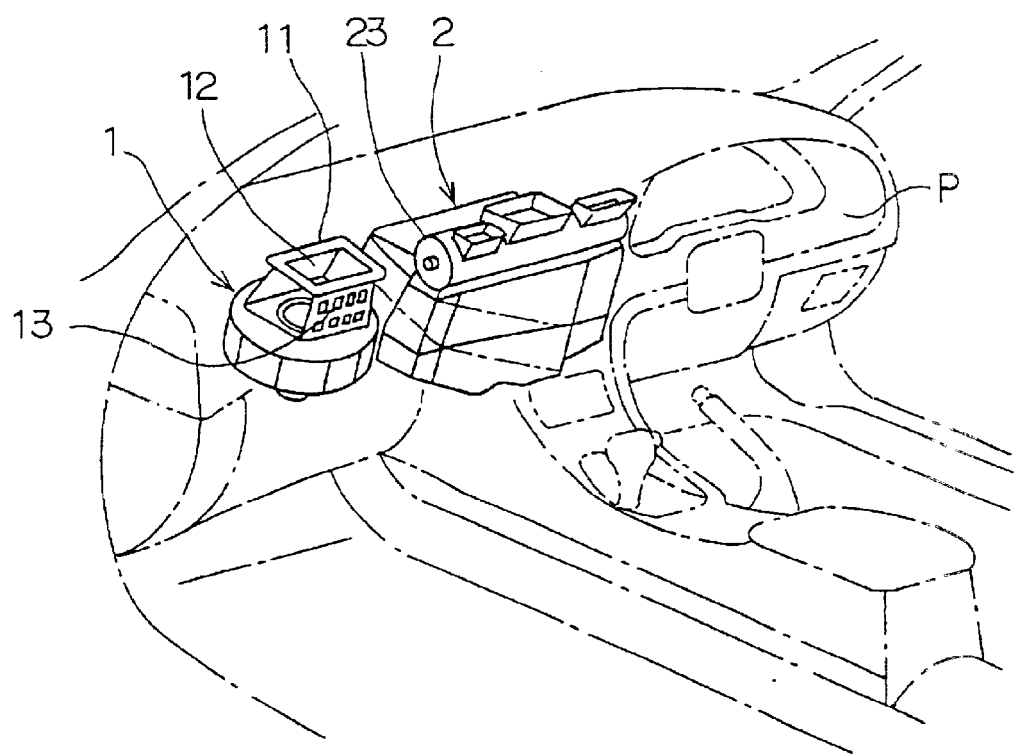
FIG. 4 is a schematic view, in perspective, showing the air conditioner of the first embodiment mounted within the vehicle.

Referring specifically to FIGS. 3 and 4, a vehicle includes an engine compartment A and a passenger compartment B. These compartments A and B are divided by a partition C (generally referred to as a "fire wall" and made from an iron plate). A dashboard P is arranged within the passenger compartment B. The air conditioner comprises a fan unit 1 which is offset (to the left wheel the vehicle has a right steering wheel) from the central portion of the dashboard P in the width direction of the vehicle.

The fan unit 1 has an internal air/external air selector housing 11 arranged at its top and adapted to allow for selective introduction of internal and external airs. The internal air/external air selector housing 11 includes an external air inlet 12 and internal air inlets 13. An internal air/external air selector door (not shown) is mounted within the internal air/external air selector housing 11 so as to selectively open and close the external air inlet 12 and the internal air inlets 13.

Figure 5:
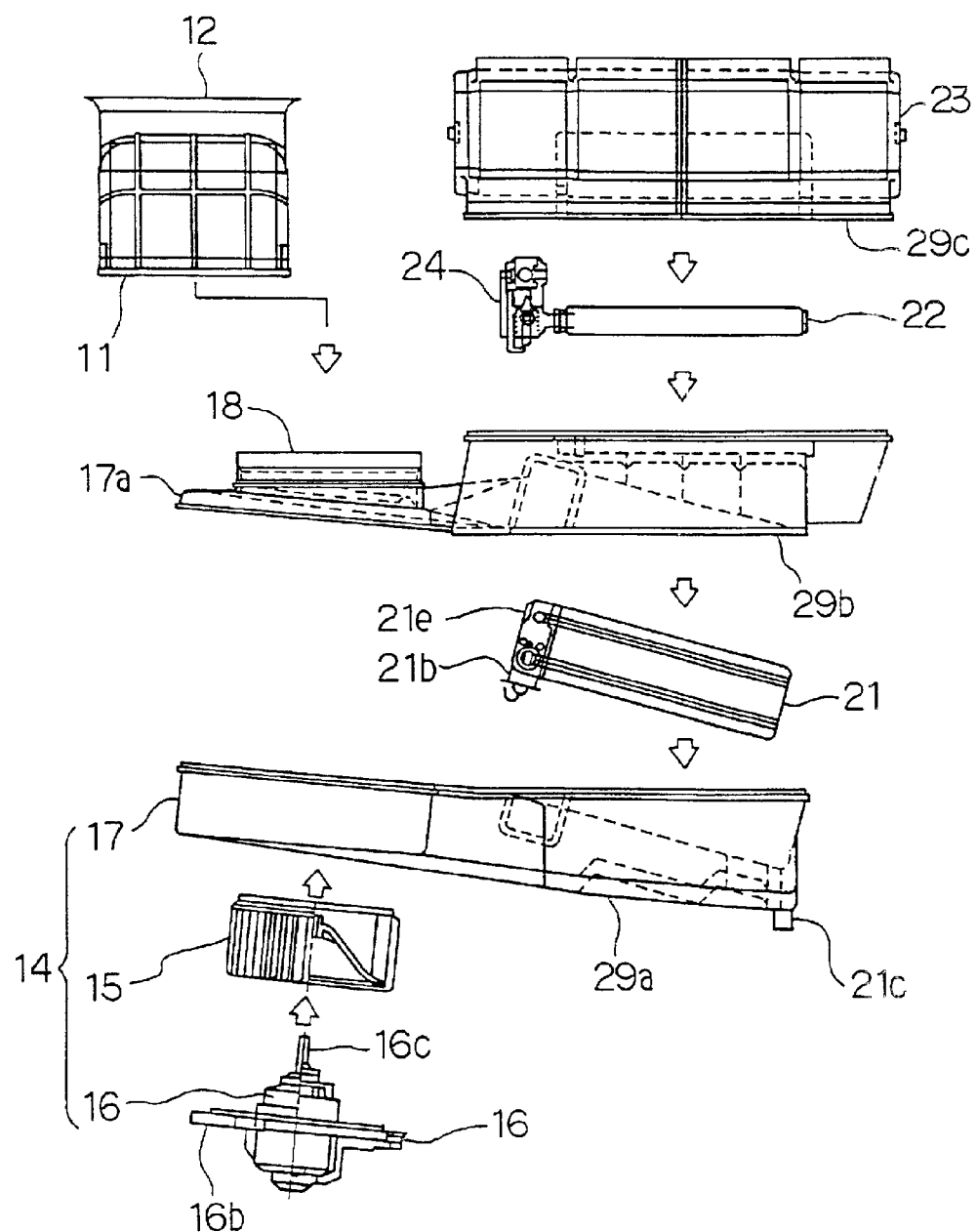
FIG. 5 is a disassembled view of the air conditioner of the first embodiment.

As shown in FIG. 5, a blower 14 is mounted below the internal air/external air selector housing 11. The blower 14 includes a centrifugal multi-blade fan (scirocco fan) 15, a fan motor 16, and a scroll casing 17.

The fan 15 has a vertical rotary shaft. As the fan 15 rotates, an air flows from the internal air/external air selector housing 11 into the scroll casing 17 through a bellmouth-shaped inlet 18 (see FIG. 5) at the top of the scroll casing 17. The air flows substantially horizontally through the scroll casing 17 and is directed toward an outlet (as is clear from FIG. 3, from the left side toward the right side of the passenger compartment B).

The fan An air conditioning unit 2 is arranged in the central portion of the dashboard P within the passenger compartment B and includes heat exchangers which will later be described. The air conditioning unit 2 includes an evaporator (cooling heat exchanger) 21 disposed in an approximately horizontal fashion. The air flows from the fan unit 1 and is introduced into the evaporator 21 from lower side.

A heater core (heating heat exchanger) 22 is disposed in an approximately horizontal fashion and located downstream of (above) the evaporator 21 in the direction in which the air flows. The heater core 22 utilizes an engine coolant (hot water) as a heat source. A blow mode selector 23 is located above (downstream of) the heater core 22.

In this embodiment, there is provided a hot water flow control valve 24 (see FIG. 5) for controlling the flow of hot water to the heater core 22 as a temperature control means. Under the control of the hot water flow control valve 24, the heater core 22 adjusts the amount of heat applied to the air and thus, the temperature of the air fed into the passenger compartment.

The blow mode selector 23 changes blow modes and includes a center face air outlet 25 (see FIGS. 1 and 2) communicated with a center face (upper) air outlet (not shown) formed on the center of the dashboard, a side face air outlet 26 communicated with a side face air outlet (not shown) formed on right and left sides of the dashboard, a foot air outlet 27 communicated with a foot (lower) air outlet (not shown) formed at the lower portion of the dashboard, and a defroster air outlet 28 communicated with a defroster air outlet (not shown) formed on the dashboard at the front window side. An air is directed toward the head of a vehicle occupant through the center face air outlet and the side face air outlet, toward the feet of the vehicle occupant through the foot air outlet, and toward the windshield of the vehicle through the defroster air outlet. The air outlet 25 to 28 are selectively opened and closed by door means (in the form of a plate-like door, a rotary door with an arcuate outer surface, and a film-like door).

Figure 6:
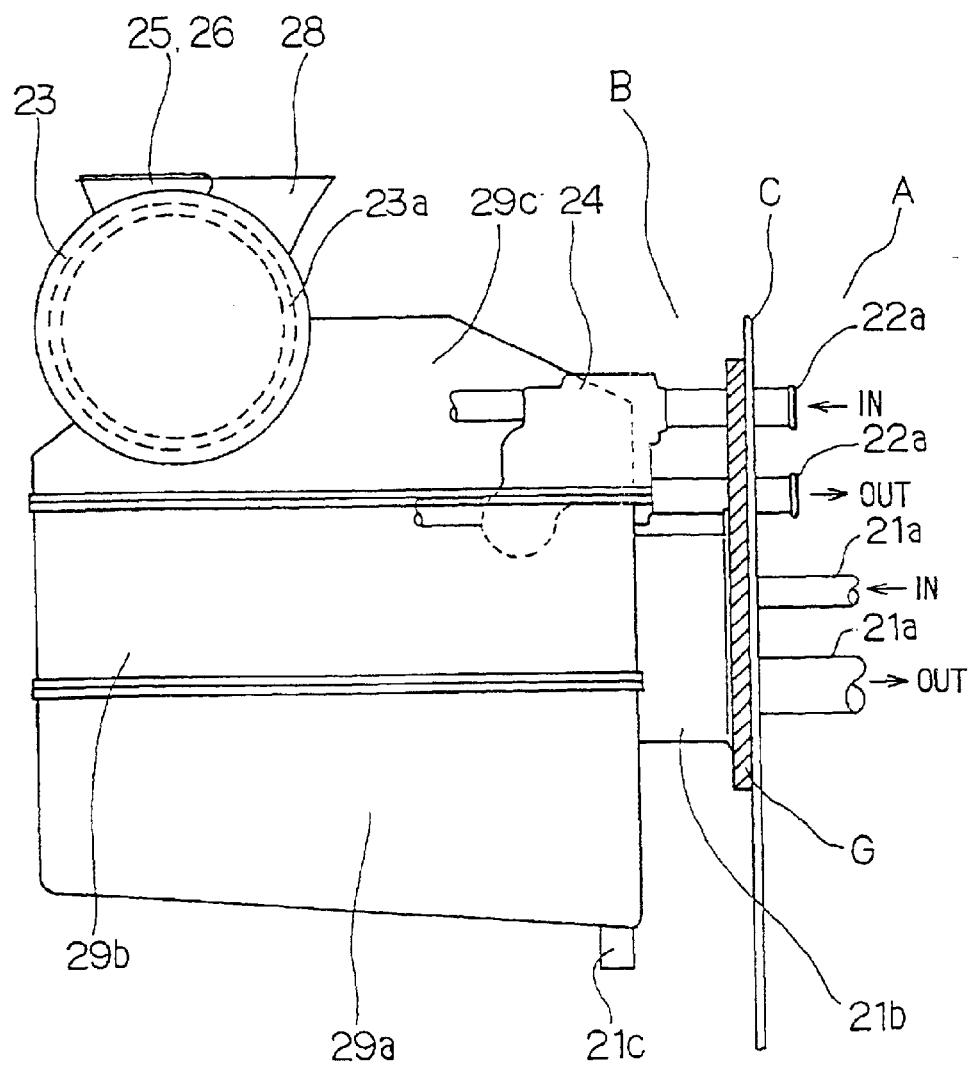
FIG. 6 is side view showing the relationship between the air conditioner of the first embodiment and a partition located between an engine compartment and a passenger compartment.

The blow mode selector 23 has a known structure and will not be described herein. In this embodiment, the blow mode selector 23 is cylindrical in shape as shown in FIG. 6 A rotary door 23a is rotatably disposed within the blow mode selector 23 and has a cylindrical outer peripheral surface in which openings are defined to allow for the passage of the air. The rotary door 23a is rotated to open and close the air outlets 25 to 28 to select a desired blow mode such as a face blow mode, a bilevel blow mode, a foot blow mode, a defroster blow mode, foot/defroster mode.

As shown in FIG. 6, the evaporator 21 and the heater core 22 are disposed adjacent to the partition C. Hot water pipes 22a are connected to the heater core 22 to allow hot water to flow into and out of the heater core 22. Similarly, refrigerant pipes 21a are connected to the evaporator 21 to allow refrigerant to flow into and out of the evaporator 21. Both the hot water pipes 22a and the refrigerant pipes 21a are located in the engine compartment A. The pipes 22a and 21a, when assembled, extend through the partition (fire wall) C into the engine compartment A.

During mounting of the automotive air conditioner, the hot water pipes 22a and the refrigerant pipes 21a can be coupled within the engine compartment A rather than the passenger compartment B. This arrangement facilitates coupling of the pipes since it is not necessary to use such a small space as the dashboard P.

Referring to FIG. 6, the partition C includes pipe holes (not shown) sealed by sealing members (grommet) G made of rubber or similar elastic materials. A temperature responsive expansion valve 21b as a pressure reducing means is disposed between the evaporator 21 and the refrigerant pipes 21a so as to reduce the pressure of and expand the refrigerant.

Figure 1:
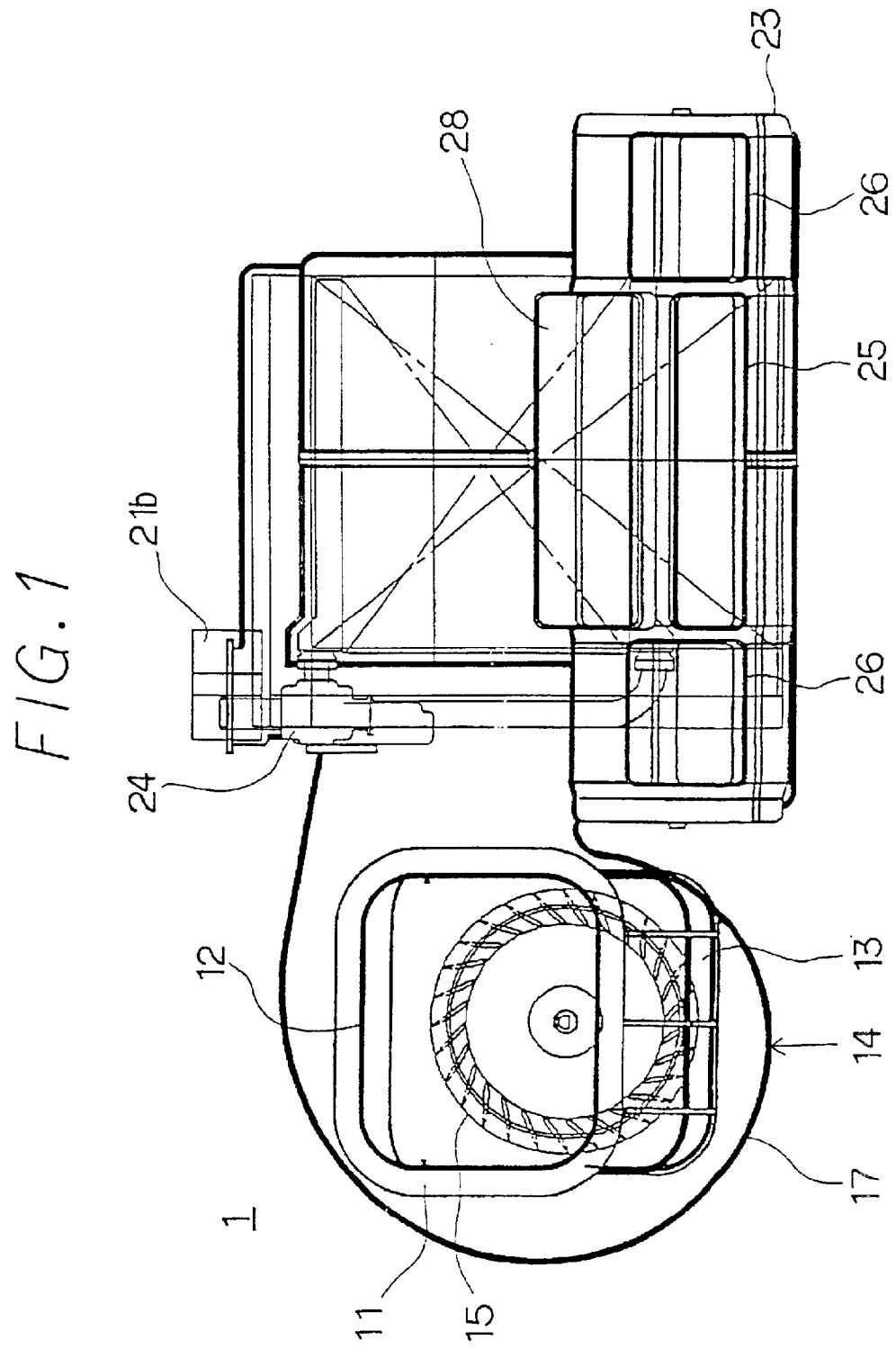
FIG. 1 is a plan view of an automotive air conditioner according to a first embodiment of the present invention.
Figure 2:
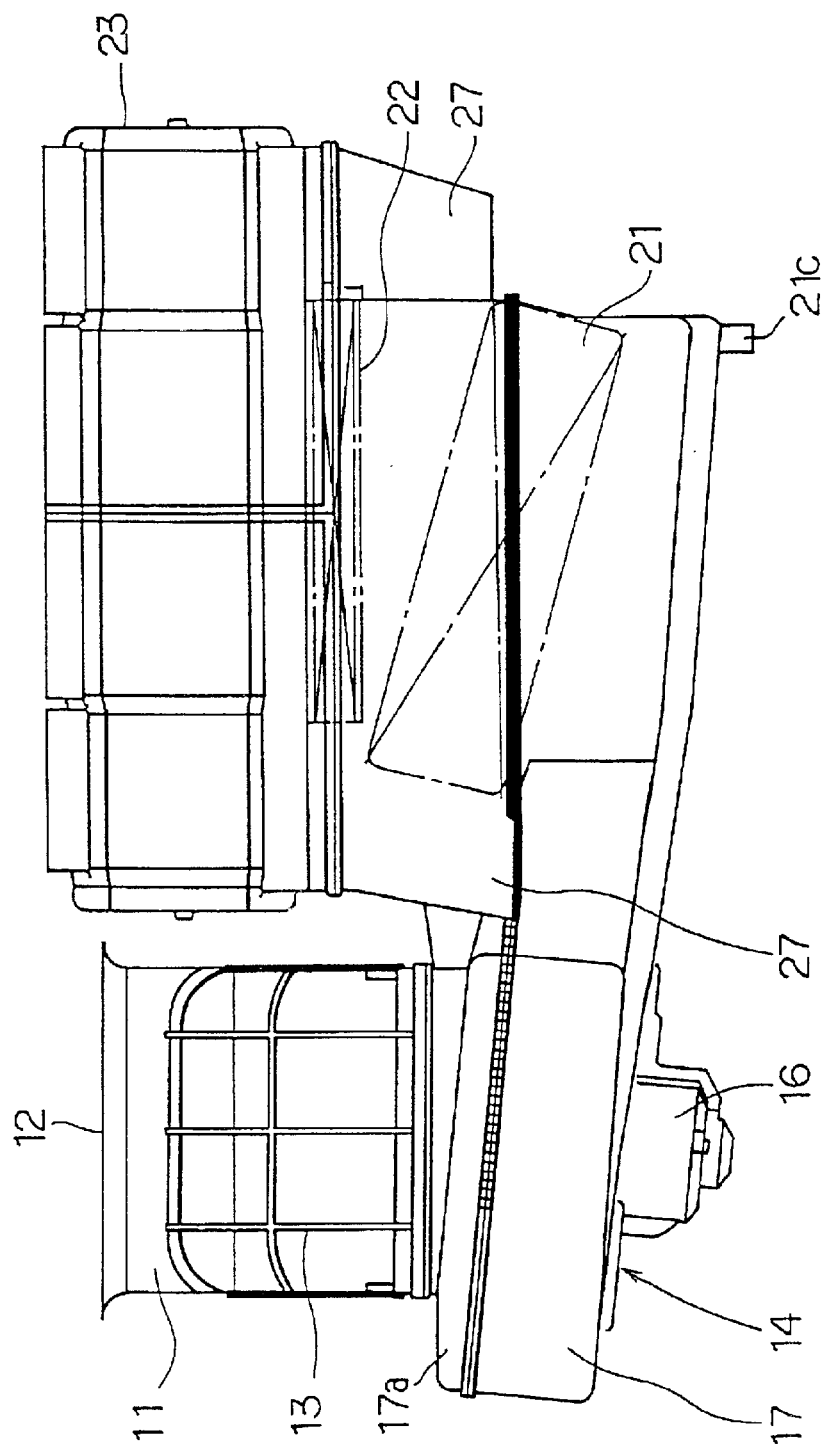
FIG. 2 is a front view of the air conditioner shown in FIG. 1.

A condensed water is produced as a result of cooling. In order to facilitate drainage of the condensed water, the evaporator 21 inclines relative to a horizontal plane as shown in FIG. 2, the evaporator 21 is so inclined downwardly that the end of the evaporator 21 that is further from the blower 14 is slightly inclined downwardly. The air from the blower 14 is directed to the bottom of the evaporator 21.

Figure 7A:
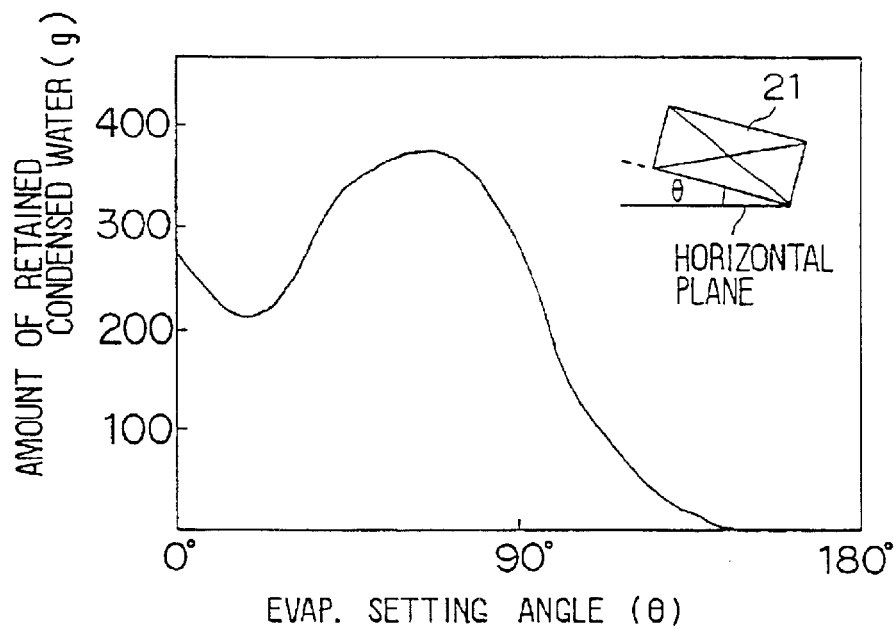
FIG. 7A is a graph showing the relationship between the angle θ of inclination of an evaporator used in the first embodiment and the retained amount of condensed water which is left within the evaporator.
Figure 7B:
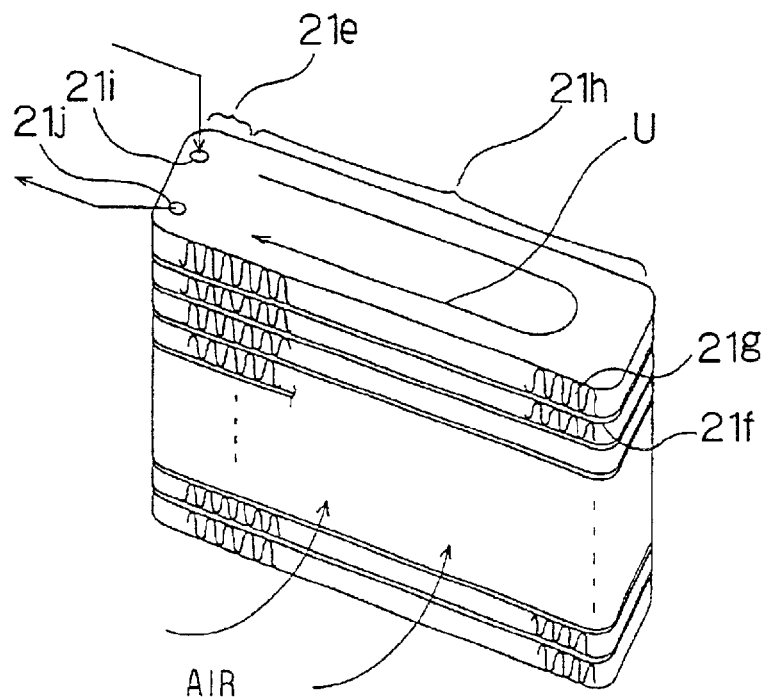
FIG. 7B is a perspective view showing the structure of the evaporator.
Figure 10A:
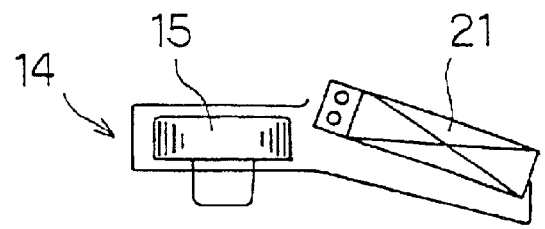
FIGS. 10A and 10B show the automotive air conditioner of the first embodiment arranged for a right steering wheel vehicle.
Figure 10B:
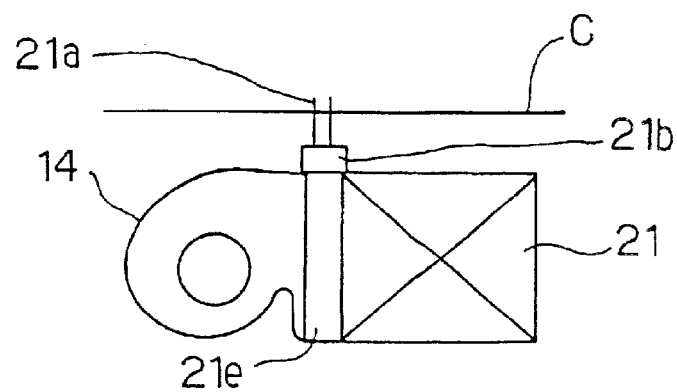
Figure 11A:
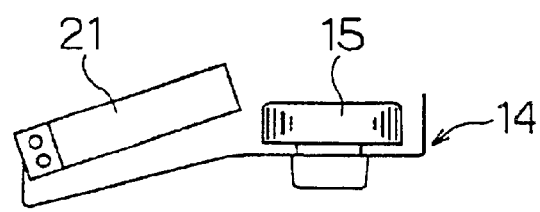
FIGS. 11A and 11B show the automotive air conditioner of the first embodiment arranged for a left steering wheel vehicle.
Figure 11B:
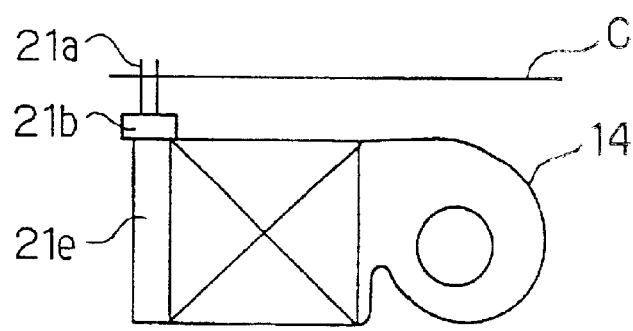

Referring to FIG. 7B, the evaporator 21 includes a plurality of thin plates made of aluminum or similar materials which has a high corrosion resistance and a high thermal conductivity. The thin plates are laminated one above the other to form a multiplicity of tubes 21f. Corrugated fins 21g are disposed between adjacent tubes 21f to provide a core 21h.

The evaporator 21 includes a tank 21e connected to one end of the core 21h. The tank 21e distributes the refrigerant to the tubes 21f and collects the refrigerant from the tubes 21f. The refrigerant flows from the tank 21e to the other end of the core 21h and returns to the tank 21e (as shown by the arrow U in FIG. 7B).

The tank 21e includes a refrigerant inlet 21i for receiving a refrigerant in two phase, that is, gas and liquid, whose pressure is reduced by the expansion valve 21b, and a refrigerant outlet 21j for discharging a refrigerant in gas phase which is evaporated in the core 21h.

The tubes 21f of the evaporator 21 extend in the direction in which the air flows (from left to right in FIGS. 2 and 5). In this way, the air urges the condensed water toward the downwardly inclined end (right end in FIGS. 2 and 5) of the evaporator 21 along the tubes 21f.

A lower case 29a (see FIG. 5) is disposed below (upstream of) the evaporator 21 and made of resin. A condensed water drain pipe 21c is integrally connected to the bottom of the lower case 29a and corresponds in position to the downwardly inclined end of the evaporator 21. The condensed water is discharged from the evaporator 21 through this drain pipe 21c.

FIG. 5 is a disassembled view of the air conditioner. The motor 16 has an output or rotary shaft 16a connected to the fan 15. The fan 15 is disposed within the scroll casing 17. The scroll casing 17 is integrally formed in the lower case 29a. The motor 16 has a flange 16b fixedly secured to the scroll casing 17.

The lower case 29a has a mounting surface on which the evaporator 21 is placed. The evaporator 21 is secured between the lower case 29a and an intermediate case 29b made of resin.

The intermediate case 29b has an integral cover 17a adapted to cover the scroll casing 17 and including a bellmouth-shaped inlet 18. The internal air/external air selector housing 11 is integrally mounted to the bellmouth-shaped inlet 18.

The intermediate case 29b has a mounting surface on which the heater core 22 together with the hot water flow control valve 24 is placed. The heater core 22 is secured between the intermediate case 29b and an upper case 29c made of resin.

The blow mode selector 23, the center face air passage 25, the side face air passage 26, the foot air passage 27, the defroster air passage 28 and the rotary door 23a are all formed in the upper case 29c. The cases 29a to 29c are detachably secured to the internal air/external air selector housing 11 by known resilient metal clips, screws or other means.

With the air conditioner thus constructed, the evaporator 21 is arranged in a substantially horizontal direction, and an air is blown from the lower end toward the upper end of the evaporator 21. Since the air flows in a direction opposite to the condensed water dropping direction, there is a need for any means for smoothly draining the condensed water from the evaporator 21.

To this end, this embodiment provides various means for facilitating drainage of the condensed water. Firstly, the evaporator 21 is slightly inclined with respect to a horizontal plane. Referring specifically to FIGS. 2 and 5, an air is fed from the blower 14 to the bottom of the evaporator 21 and flows (to the right in FIGS. 2 and 5) from the rear end to the front end of the evaporator 21. The evaporator 21 is so inclined downwardly that the end of the evaporator 21 which is further from the blower 14 is slightly inclined downwardly, i.e., the evaporator 21 gradually inclines downward along the direction of the air flow. In order to reduce the amount of condensed water left within the evaporator 21, inventor studied and made a graph showing the relationship between retained amount of condensed water and arrangement angle θ formed from the horizontal plane and the lower end plane 21n of the evaporator 21 as shown in FIG. 7A. The evaporator 21 is preferably inclined at an angle θ of 10 to 30 degrees to reduce the retained volume of condensed water as shown in FIG. 7A.

Secondly, the tubes 21f of the evaporator 21 extend (to the right in FIG. 5) in a direction identical to the direction in which the air flows. By this arrangement, the condensed water is forced toward the downwardly inclined end (right end in FIGS. 2 and 5) of the evaporator 21 by the air while it flows on and along the tubes 21f. The condensed water is drained from the evaporator 21 through the condensed water drain pipe 21c. The drain pipe 21c is provided below the downwardly inclined end of the evaporator 21 and integrally molded to the bottom of the lower case 29a.

The inventor has carefully observed how the condensed water is discharged from the air conditioner. As a result of this observation, it has been found that as shown in FIGS. 8A and 8B, the condensed water is directed toward the downwardly inclined end of the evaporator 21 under gravity and air pressure to form small droplets W. when those droplets coalesce and grow to form a certain size of droplet, then it drops from the evaporator 21. This occurs in an intermittent manner.

With this in mind, the inventor reached an idea to continuously move the condensed water to the drain pipe 21c of the case 29a before the droplets W reaches a certain size to be dropped.

To this end, a plurality of vertical guide plates 21k are located below the downwardly inclined end of the evaporator 21 to which the droplets W are directed as shown in FIGS. 9A, 9B and 9C. The guide plates 21k are substantially in contact with (or may be separated a very small distance away from) the tubes 21f. In this embodiment, the guide plates 21k are integrally formed in the lower case 29a. As shown in FIG. 9B, the guide plates 21k are arranged at predetermined intervals along the width of the downwardly inclined end of the evaporator 21.

The lower case 29a has a side wall 29a. The guide plates 21k are spaced as at 21m from the side wall 29 as shown in FIG. 9A. The drain pipe 21c is located below this space 21m.

Operation of the air conditioner thus constructed will now be described. Referring to FIG. 5, an air flows from the internal air/external air selector housing 11 into the scroll casing 17. The, the fan 15 causes the air to flow horizontally through the scroll casing 17. The air is dried and cooled until it reaches the lower part of the evaporator 21. Thereafter, the air flows upward and enters the heater core 22. The air is heated within the heater core 22.

In this embodiment, the hot water flow control valve 24 is employed as a temperature control means to control the flow of hot water fed to the heater core 22. The hot water flow control valve 24 is of the type, a so-called adjustable flow reheat type, which adjusts the flow of the hot water to provide an air of a desired temperature. The air is distributed to a desired air outlet through the rotary door 23a of the blow mode selector 23 after it is reheated to a desired temperature within the heater core 22.

This embodiment offers the following advantages.

(1) The evaporator 21 and the heater core 22 extend in a substantially horizontal direction and are laminated one above the other. An air is introduced into the evaporator 21 from below and then moved upwards. This arrangement eliminates the need for longitudinally extending air ducts and thus, enables a substantial reduction in the size of the air conditioning unit in the longitudinal direction of the vehicle.

Also, the vertical space occupied by the heat exchangers is reduced to allow for mounting of the air conditioning unit in the vehicle easily.

(2) The heat exchanger pipes 21a and 22a extend inter the engine compartment A. This arrangement eliminates the need for auxiliary pipes within the passenger compartment B, substantially reduces the production cost, and facilitates coupling of the pipes.

(3) As shown in FIG. 5, most of the air conditioner components in the present invention are arranged in a vertical fashion. The components are assembled from the bottom to the top. This manner of assembly enables a reduction in the number of production steps.

(4) The evaporator 21 is designed to receive an air from below and is inclined downwardly toward the direction along which the air flows. The tubes 21f of the evaporator 21 are oriented in a direction identical to the direction in which the air flows. The air causes a condensed water to flow on the surfaces of the tubes. Thus, the condensed water is smoothly directed toward the downwardly inclined end (right end in FIG. 2) of the evaporator 21.

Moreover, the vertical guide plates 21k are located below and substantially in contact with the downwardly inclined end of the evaporator 21. As shown in FIG. 9C, a condenses water is directed to the downwardly inclined end of the evaporator 21 and then extended between the front end of the evaporator 21 and each guide plate 21k. The condensed water is continuously moved down along the surface of each guide plate 21k.

Even if the evaporator 21 is arranged in an approximately horizontal direction and designed to receive the air from below, the condensed water is smoothly moved downward without growing to a large droplet. The space 21m is left between the guide plates 21k and the side wall 29a of the lower case 29a. The drain pipe 21c is located below this space 21m to smoothly discharge the condensed water after it is moved down along the guide plates 21k. Experiments have shown that the condensed water forms a bridge or is extended between the guide plates 21k and the evaporator 21 and is continuously moved down along the surface of each guide plate 21k.

(5) As the condensed water is moved upstream of or below the evaporator 21, it contacts a relatively high temperature air which has not yet been cooled. Since the temperature of the condensed water increases, there is no substantial decrease in the temperature of the outer surface of the lower case 29a. This substantially reduces or avoids the occurrence of dewdrops, so that an insulator (thermal insulator) to be installed within the case is eliminated. This enables a further reduction in the production cost.

However, the amount of the condensed water left within the evaporator 21 varies depending on the angle θ of inclination of the evaporator 21 as shown in FIG. 7A. To reduce the amount of condensed water left within the evaporator 21, it is imperative that the evaporator 21 is inclined at an angle θ of 10 to 30 degrees.

(6) An engine and an air compressor, whether a steering wheel is mounted at the right side or left side of the vehicle, are normally mounted in a fixed position within the engine compartment A. It is desirable to form pipe holes in the partition C in the same position regardless of whether the steering wheel is mounted at the right side or the left side of the vehicle.

To meet this need, in the embodiment shown in FIGS. 10A, 10B, 11A and 11B, the offset position of the blower 14 and the position of the refrigerant pipe 21a of the evaporator 21, (the position of the tank 21e of the evaporator 21) are laterally reversed. Similarly, the position of the hot water pipe 22a of the hot water flow control valve 24 in the heater core 22 is laterally reversed.

(Embodiment 2)

Referring to FIGS. 12A and 12B, the guide plate 21k has a cross shape to improve drainage of the condensed water. Specifically, the cross-shaped guide plate 21k has a flange 210k to stop the flow of the air and prevent upward flow of the air behind the flange 210k.

By this arrangement, the condensed water can more easily drop behind the flange 210k for better drainage. As an alternative, the guide plate 21k may have a T-shape to facilitate drainage of the condensed water.

Figure 13:
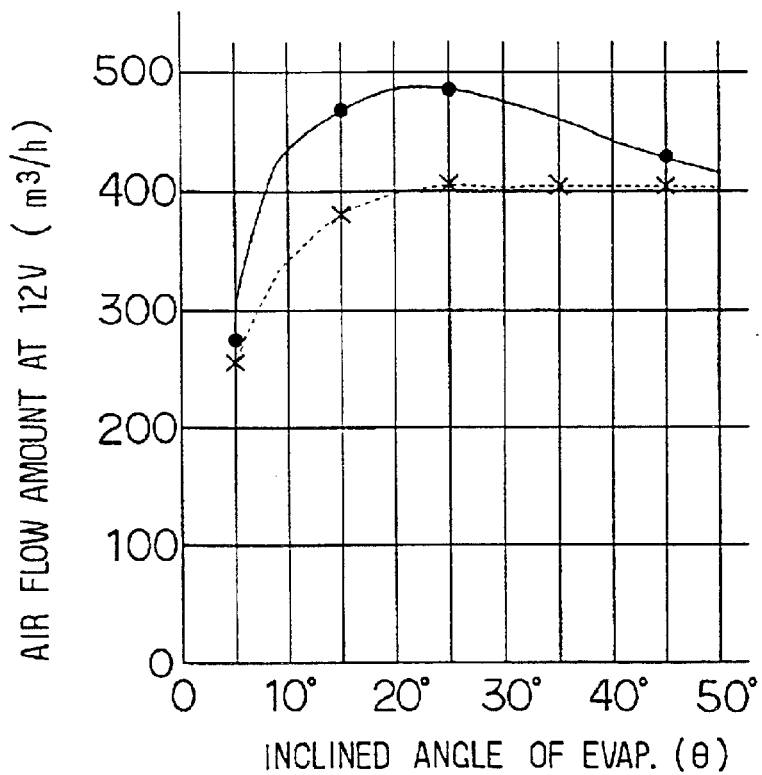
FIG. 13 is a graph showing the relationship between the inclined angle θ of the evaporator and the amount of air to better drainage of the condensed water with the guide plates used in the second embodiment of the present invention.

FIG. 13 shows effects of the second embodiment. The vertical axis indicates the flow of air when 12 volts are applied to the fan motor 16 (see FIG. 5). The horizontal axis indicates the angle of inclination of the evaporator 21 with respect to a horizontal plane.

Referring to FIG. 13, the solid line shows the case in which the cross-shaped guide plates 21k of the second embodiment are provided. The broken line shows the case in which no cross-shaped guide plate 21k is provided.

As is shown, the cross-shaped guide plates 21k promote drainage of the condensate to reduce the amount of the condensed water left within the evaporator 21 and thus, the resistance to flow is also reduced. This results in an increase in the flow of air and thus, in better performance of the air conditioner.

Referring to FIG. 11, through experiments, it has been found that the evaporator 21 is preferably inclined at an angle θ of 10 to 30 degrees.

(Embodiment 3)

Figure 14:
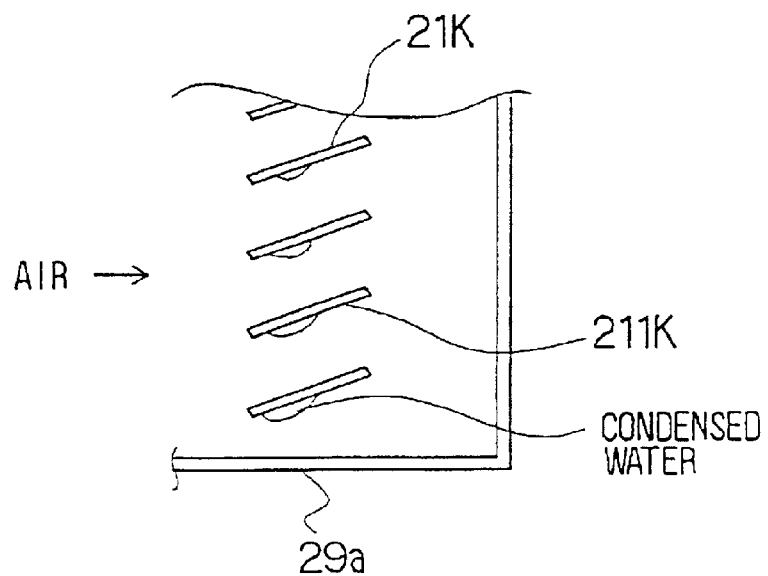
FIG. 14 illustrates guide plates used in a third embodiment of the present invention.

Referring to FIG. 14, the guide plates 21k are flat and inclined with respect to the direction of flow of the air. The guide plate 21k has a rear surface 211k. The upward flow of the air is retarded behind the rear surface 211k so as to allow the condensed water to easily drop behind the rear surface of each guide plate 21k.

(Embodiment 4)

Referring to FIG. 15A, the lower case 29a has a wavy portion 21k' at a position below the downwardly inclined end of the evaporator 21. The wavy portion 21k' corresponds to the guide plates 21k and functions to direct the condensed water out of the evaporator 21.

In the foregoing embodiments, the guide plates 21k and the wavy portion 21k are integral with the lower case 29a, made of resin, to substantially reduce the production cost. However, these members 21k and 21k' need not be integral with the lower case 29 and may be discrete members with the same function. In such a case, these members 21k and 21k' may be attached to the lower case 29 or the evaporator 21 by any suitable means.

(Embodiment 5)

Figure 16:
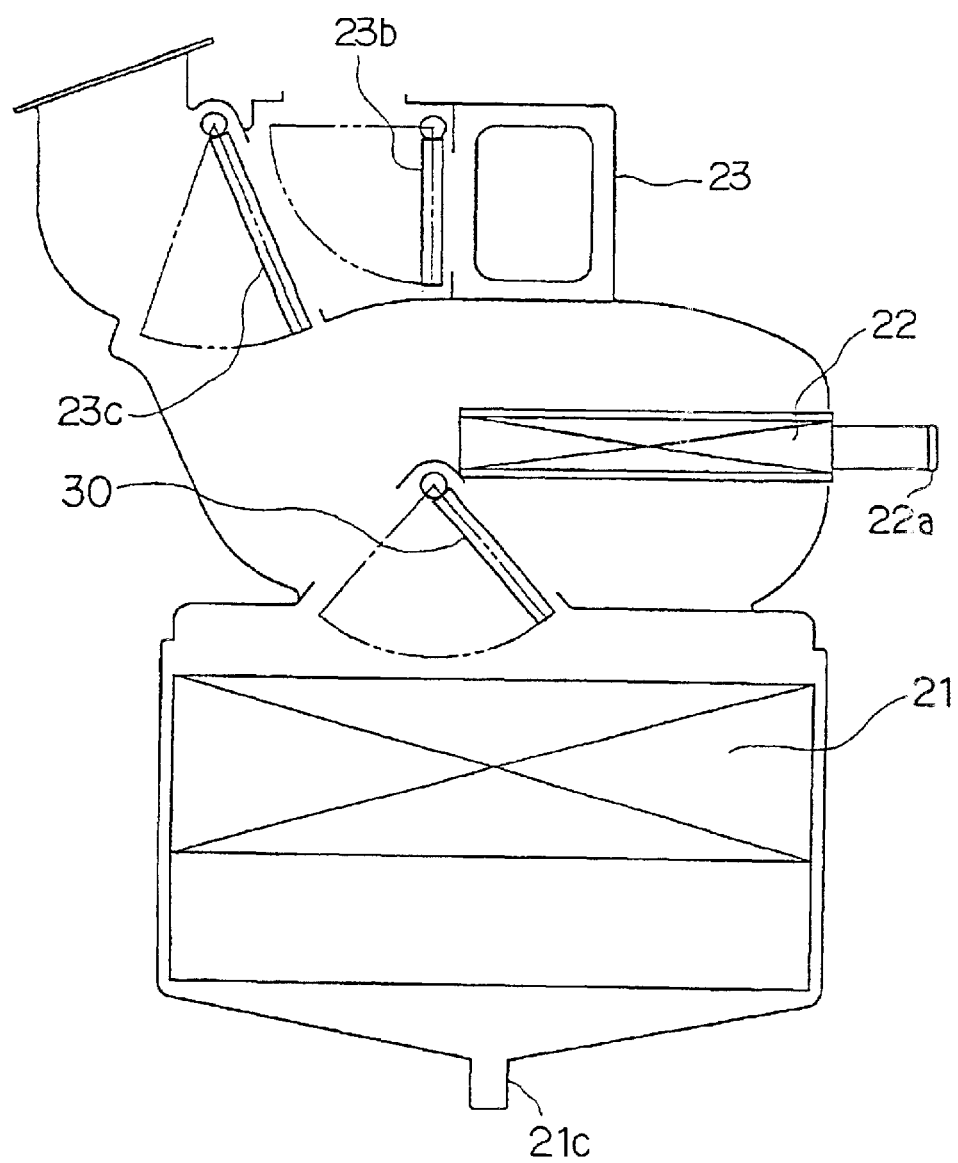
FIG. 16 is a sectional side view of the second embodiment of the present invention.
Figure 17:
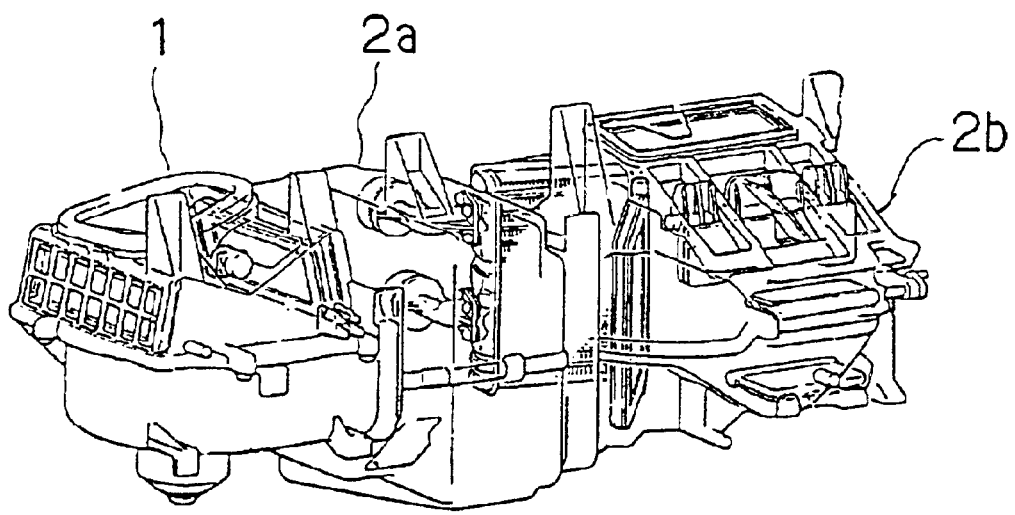
FIG. 17 is a perspective view of a lateral layout type automotive air conditioner in the prior art.
Figure 18:
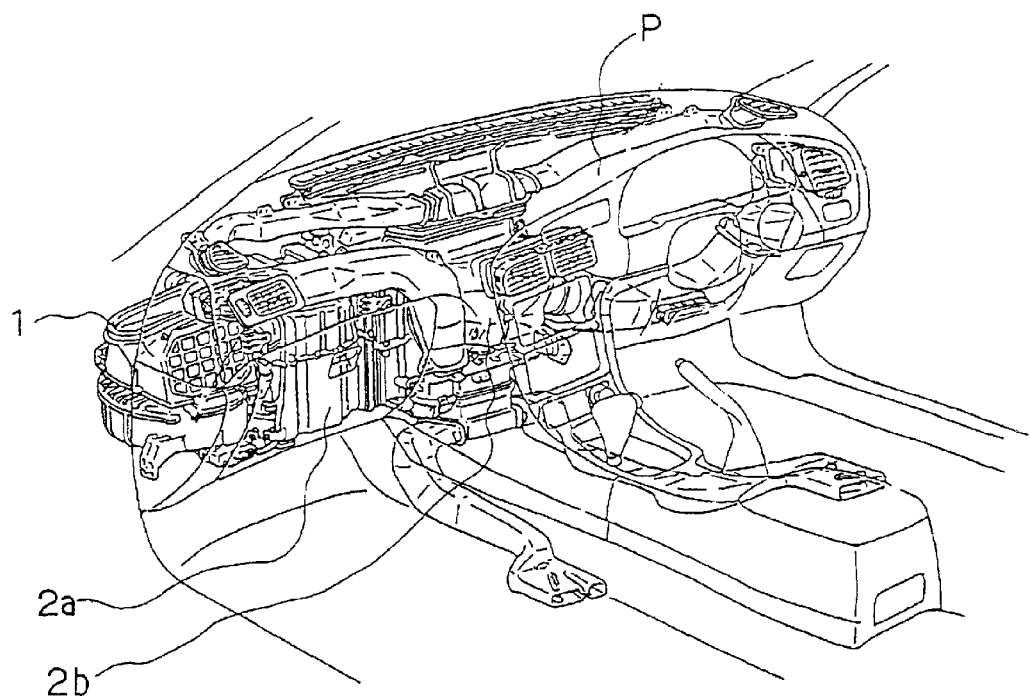
FIG. 18 is a perspective view showing an automotive air conditioner arranged laterally within a vehicle in the prior art.
Figure 19:
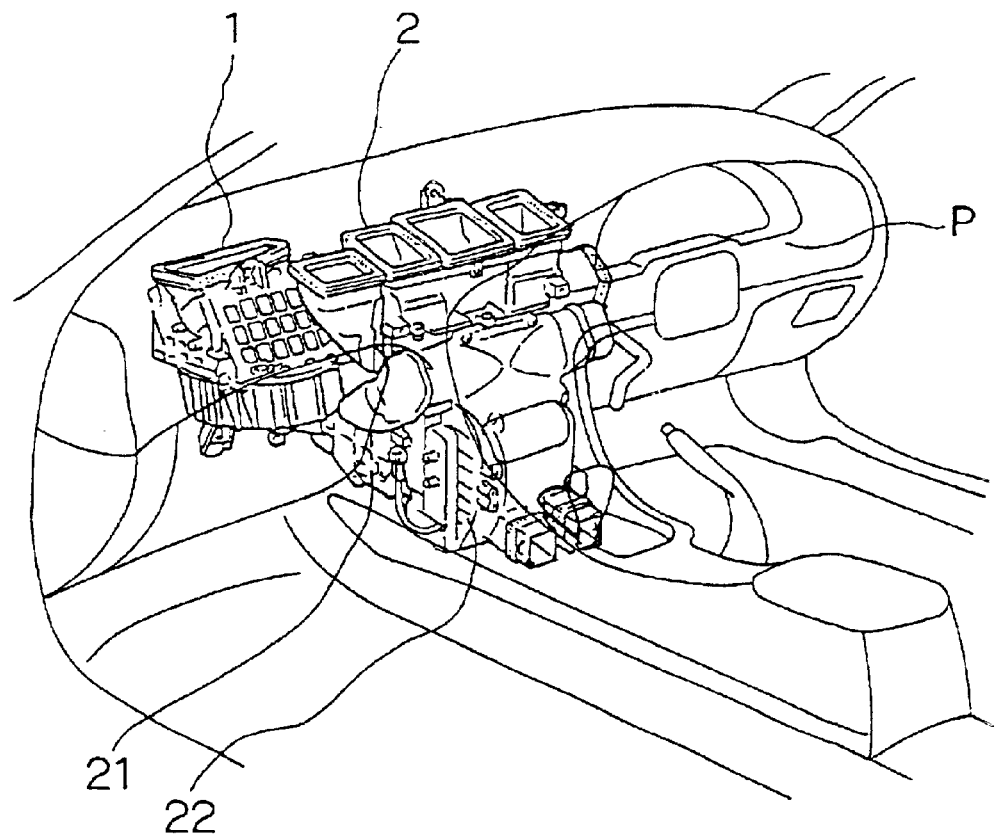
FIG. 19 is a perspective view of a center layout automotive air conditioner arranged within a vehicle in the prior art.
Figure 20:
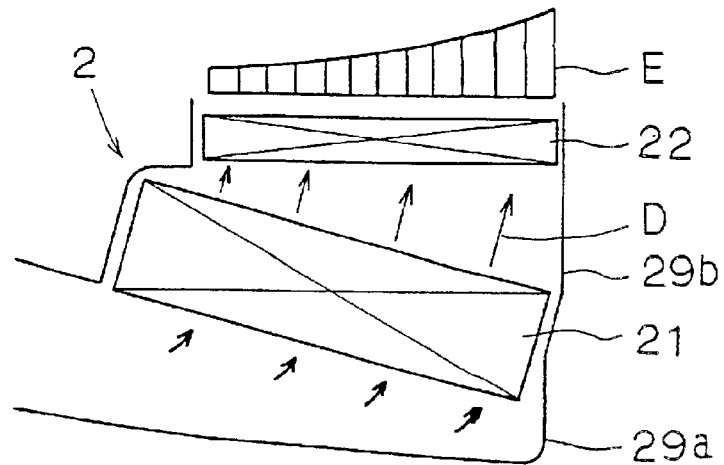
FIG. 20 is a schematic view of the main part of the cooling unit to show the air blow speed distribution.

Referring to FIG. 16, an air mixing door 30 as a temperature control means may be employed in lieu of the adjustable flow reheat type using the hot water flow control valve 24. The blow mode selector 23 includes plate-like doors 23b and 23c in lieu of the rotary door 23a. The doors 23b and 23c serve as a means for allowing a selection of one of the air passages. As in the first embodiment, the horizontal evaporator 21 is designed to receive an air from below and direct the air toward the horizontal heater core 22. This arrangement offers the same effect as in the previous embodiment. A further advantage of this air mixture method is that the temperature of the air can be controlled in a wide range, from low to high temperatures.

On the other hand, the use of the air mixing door 30 slightly increases the height of the unit as compared to the previous embodiment.

In the forgoing embodiments, the evaporator 21 is not limited to the laminated type evaporator. For example, serpentine type evaporator formed from flat tubes having a serpentine shape and corrugated fins is also available to be used.

(Embodiment 6)

The sixth embodiment is explained with FIGS. 20 to 23. In the embodiments described in the above, since the evaporator 21 is disposed to gradually incline downward along the direction of the air flow which flows into the evaporator 21 from the lower surface of the evaporator 21, the cooled air through the evaporator 21 flows obliquely into the heater 22 as shown as an arrow D in FIG. 20. Consequently, a distribution of the air blow speed (shown as air blow speed distribution E in FIG. 20) in the right and left direction in Figure, (i.e., along the width direction of the vehicle) in the heater 22 is dispersed. The air flow speed passing through the heater 22 increases as the air flow passes the right side of the heater 22 in the figure as shown as the distribution E. Further, the dispersion of the air blow speed distribution causes a dispersion of heat exchange amount in the right and left side of the heater 22, so that the air blow temperature also disperses. Consequently, an air conditioning feeling for the automotive air conditioner differs at right and left side of the compartment because of the dispersion of the air blow speed distribution and the air blow temperature, thereby the occupants feel bad air conditioning feeling.

Figure 21:
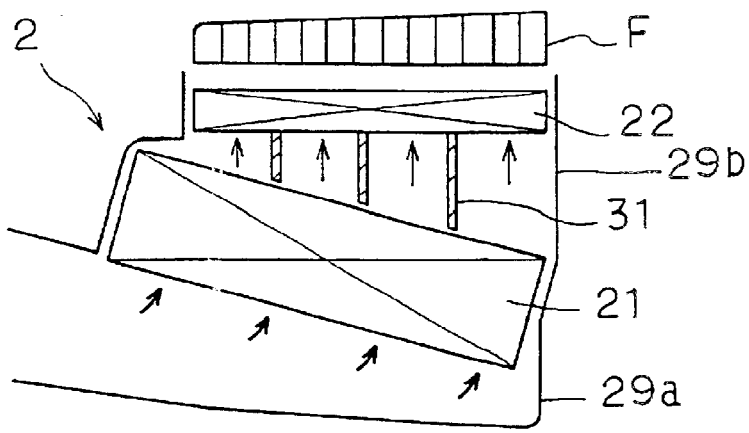
FIG. 21 is a schematic view of the main part of the cooling unit in the sixth embodiment to show the air blow speed distribution.

In the sixth embodiment, a plurality of air guide plates 31 is so disposed in the air flow passage between the evaporator 21 and the heater 22 as shown in FIG. 21 that the air blow speed distribution in the heater 22 is uniformed. The air guide plate 31 is disposed perpendicularly to an air introduction surface of the heater 22. A plurality of the air guide plates 31 are arranged at the same intervals (in the figure three guide plates are arranged). Since the air guide plates 31 are formed integrally with a resin case (specifically, the intermediate case 29b) of the air conditioner, the air guide plates can be simply produced in low production cost. The air guide plates 31 forcedly guide the air from the evaporator 21 to the heater 22 to flow into the heater 22 perpendicularly to the air introduction surface of the heater 22. Thereby, the dispersion of the air blow speed distribution in the heater 22 is so improved that the air blow speed distribution can be uniformed as shown as F in FIG. 21.

Figure 22:
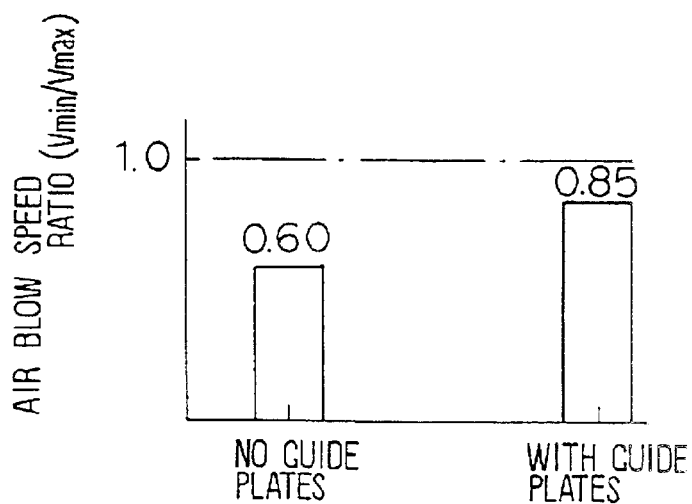
FIG. 22 is a graph showing the relationship between air blow speed ratio and air guide plates.

FIG. 22 shows concrete numerical performance based on the inventor's experiments. The experiment was performed with three air guide plates 31 and air passages divided into quarters with the guide plates 31 at the side of the air introduction surface of the heater 22. The air blow speed ratio is a ratio between the maximum air blow speed (Vmax) and the minimum air blow speed (Vmin). When the width of the heater in right and left direction in the figure is 220 m/n and the air blow speed is 480 m³/h, the air blow speed ratio with no guide plates 31 is 0.60 and that with guide plates 31 is improved to 0.85 as shown in FIG. 22.

(Embodiment 7)

Figure 23A:
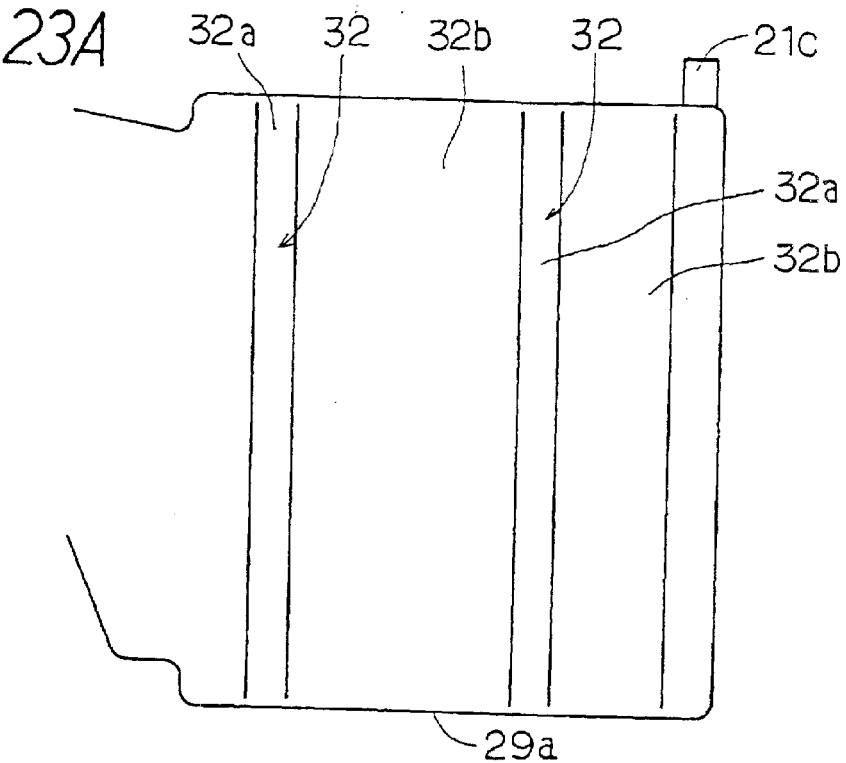
FIG. 23A is a top view of the unit case (the evaporator and heater are eliminated) in the seventh embodiment.
Figure 23B:
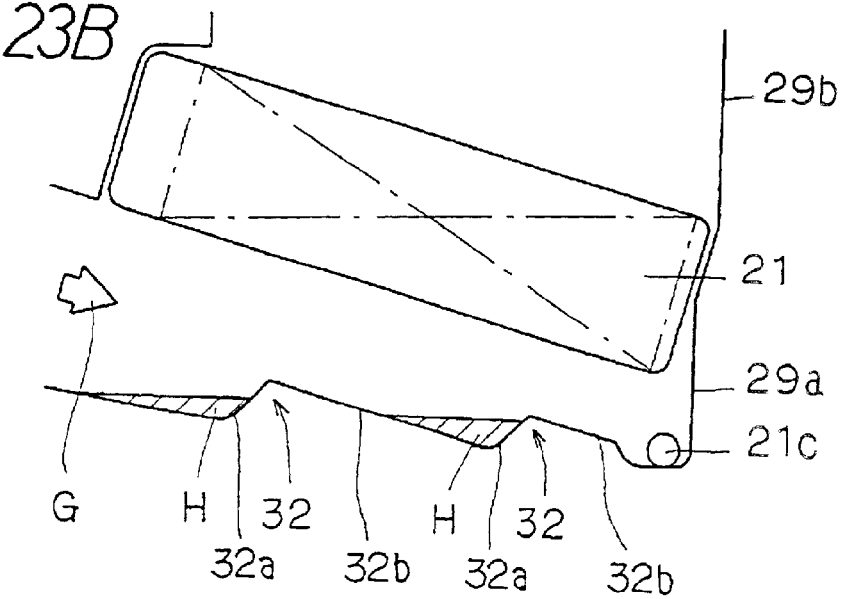
FIG. 23B is a side sectional view of the unit case and the evaporator to show a bottom shape of the unit case in the seventh embodiment.

In the seventh embodiment, the air blow speed distribution of the air flowing into the evaporator 21 is uniformed and a drainage of the condensed water generated on the evaporator 21 is secured compatibly as shown in FIGS. 23A and 23B. Since the air from the blower 14 of the blower 1 unit flows upward by perpendicularly converting under the evaporator 21, the air blow speed at the forward side (the right side in FIG. 23B) of the air flow direction becomes high.

In this embodiment, a concave and convex surface 32 having step shape is integrally formed to the resin case (specifically, the intermediate case 29a) under the evaporator 21, thereby uniformity of the air blow speed distribution of the evaporator 21 is achieved. The concave and convex surface 32 having the step shape is extended perpendicularly to the air flow (defined as G as shown in FIG. 23B) from the blower 14.

The concave and convex surface 32 has two ridges at each top of the step shape as shown in FIG. 23B and also has a steep slope 32a at the upstream side and an easy slope 32b at the downstream side. According to the inventor's experiments, a preferable difference in level between the ridge and bottom of the concave and convex surface 32 is in the range of about 15 to 20 mm to uniform the air blow speed distribution.

As shown in FIGS. 23A and 23B, when the concave and convex surface 32 is formed in entire length of the depth direction (the longitudinal direction of the vehicle) of the lower case 29a, the condensed water H is collected at the bottom of the concave and convex surface 32. While the blower 14 operates, the drainage from the condensed water discharge pipe 21c is performed in some extent by pushing out the condensed water from the bottom of the concave and convex surface 32 with the air flow produced by the blower 14. However, when the blower 14 stops, the condensed water retained on the evaporator 21 drops and pools at the bottom of the concave and convex surface 32. This may cause a nasty smell.

Therefore, to achieve both the uniformity of the air blow speed distribution of the air introduced into the evaporator 21 and the drainage of the condensed water generated in the evaporator, drain channels 33 which is lower than the bottom of the concave and convex surface 32 are formed at three locations around the concave and convex surface 32 and are communicated with the condensed water discharge pipe 21c. Since the lower case 29a is also inclined along the downward inclination of the evaporator 21 which is along the direction of the air flow, the drain channel 33 is also inclined downward along the direction of the air flow. The discharge pipe 21c is disposed at the lowest level of the drain channel 33. By adopting the above construction, the condensed water H dropped from the evaporator 21 is led to the drain channel 33 from the bottom of the concave and convex surface 32 and is smoothly discharged from the discharge pipe 21c.

Figure 24A:
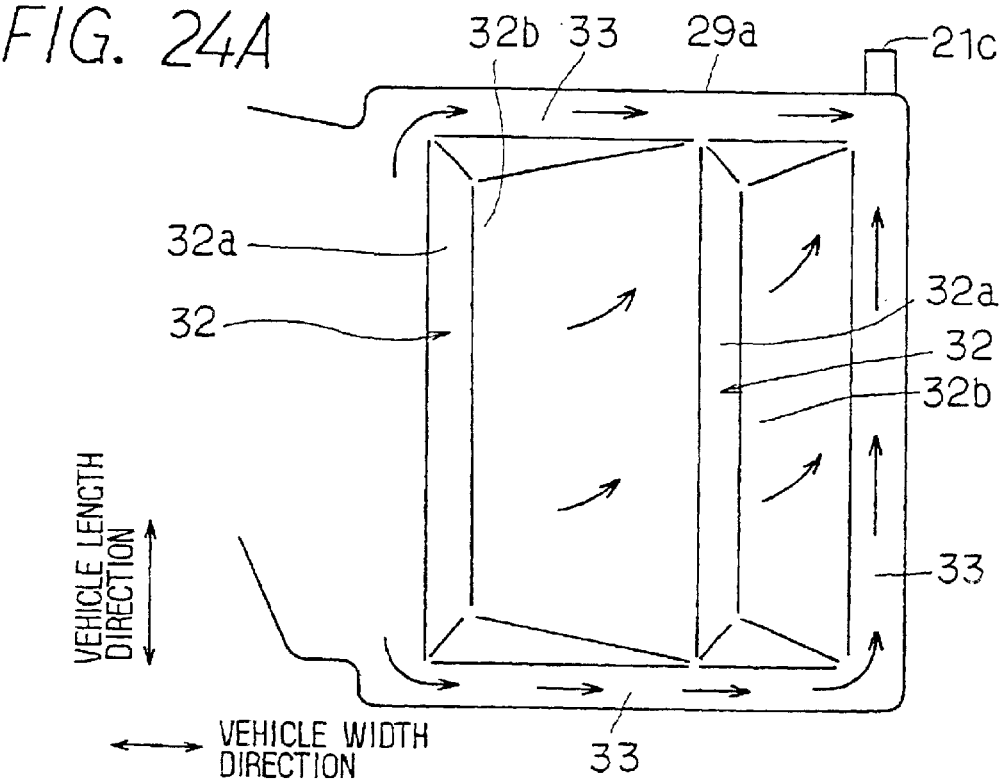
FIG. 24A is a top view of the unit case (the evaporator and heater are eliminated) in modified example of the seventh embodiment.
Figure 24B:
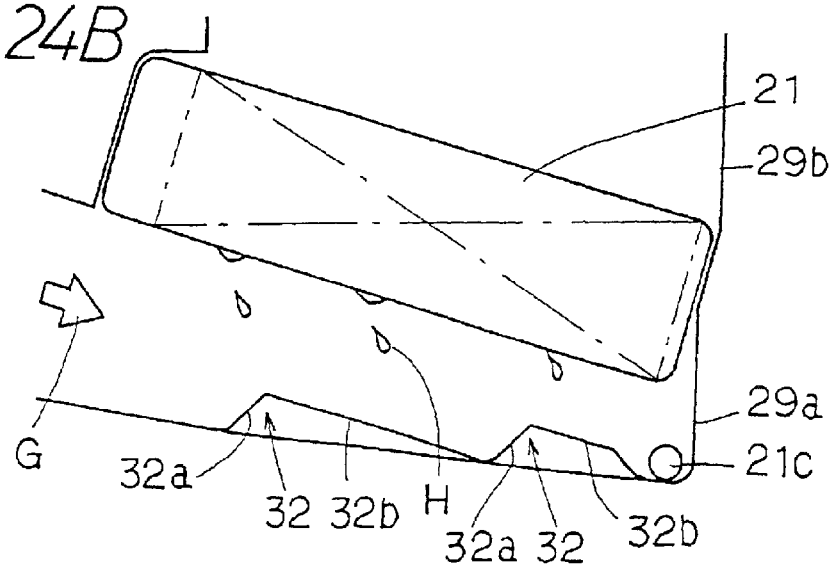
FIG. 24B is a side sectional view of the unit case and the evaporator to show a bottom shape of the unit case in modified example of the seventh embodiment.

In FIG. 24A, the drain channels 33 are formed at three portions around the concave and convex surface 32, however, it is possible to parallely form an additional drain channel 33 at the center of the two parallel drain channel 33. Further, it is possible to eliminate one of the two parallel drain channels 33. Still further, the drain channel 33 is designed to be lower level than the bottom of the concave and convex surface 32 in the above embodiment, however, the inventor experimented and confirmed that the condensed water can be discharged even if the drain channel 33 is the same level as the bottom of the concave and convex surface 32.

Figure 25:
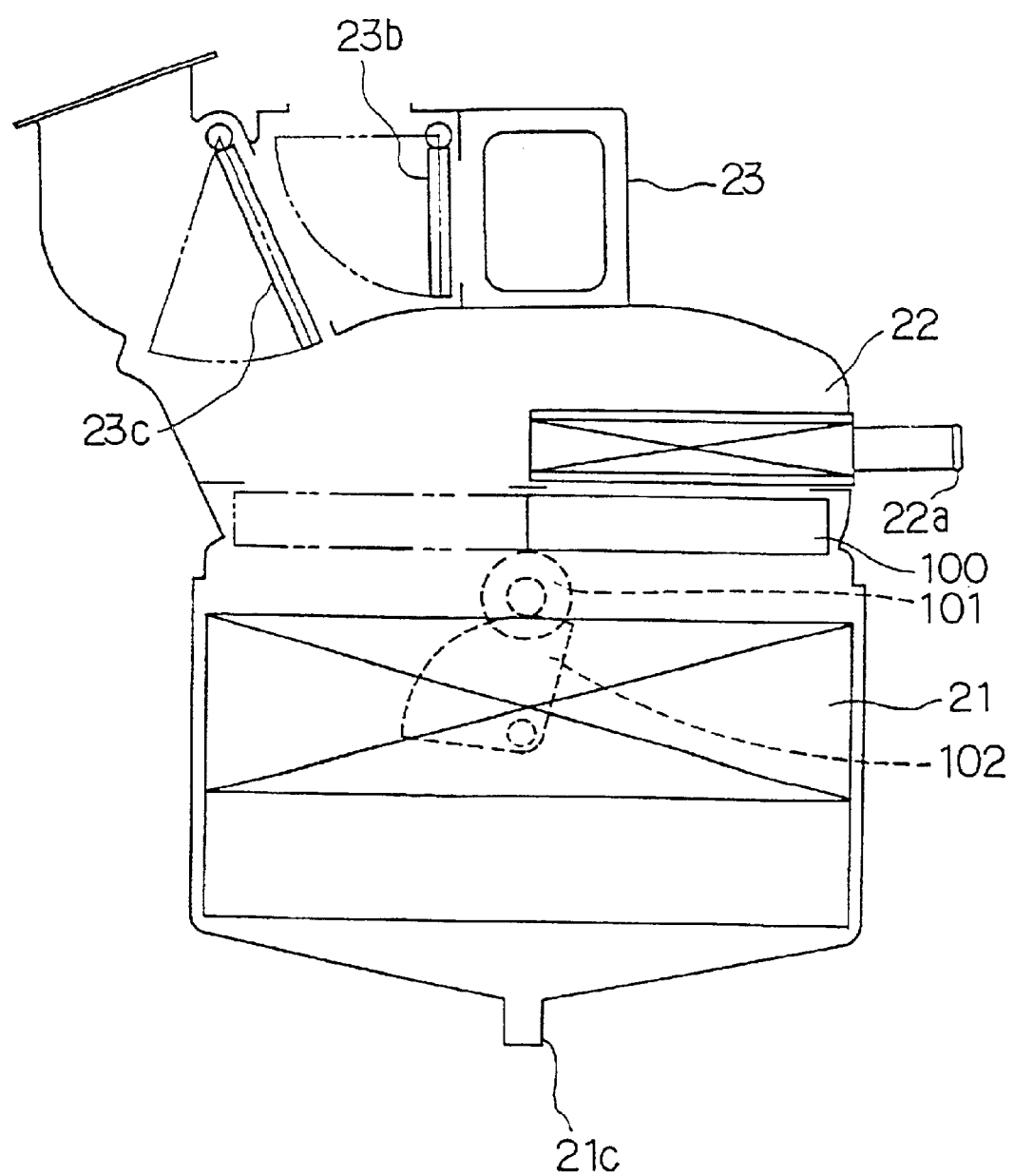
FIG. 25 is a schematic sectional view of the unit case to show a slide door.

In the present invention described above, the air mixing door 30 is used as temperature adjusting means. In this case, the large vertical dimension of the cooling unit is a demerit. As a modified embodiment, a slide door 100 which is a flat plate and slides right and left direction in FIG. 25 is proposed in FIG. 25. This slide door 100 can reduce the vertical dimension of the cooling unit. The way of driving the slide door 100 is explained hereinafter. A driving gear 102 engages with a intermediate gear 101. The intermediate gear is connected with the slide door 100. When the driving gear 102 is driven to rotate, the intermediate gear 101 is rotated and the slide door 100 is moved right and left direction in FIG. 25.

(Embodiment 8)

An eighth embodiment of the present invention will be described with reference to FIGS. 26–30.

Figure 26:
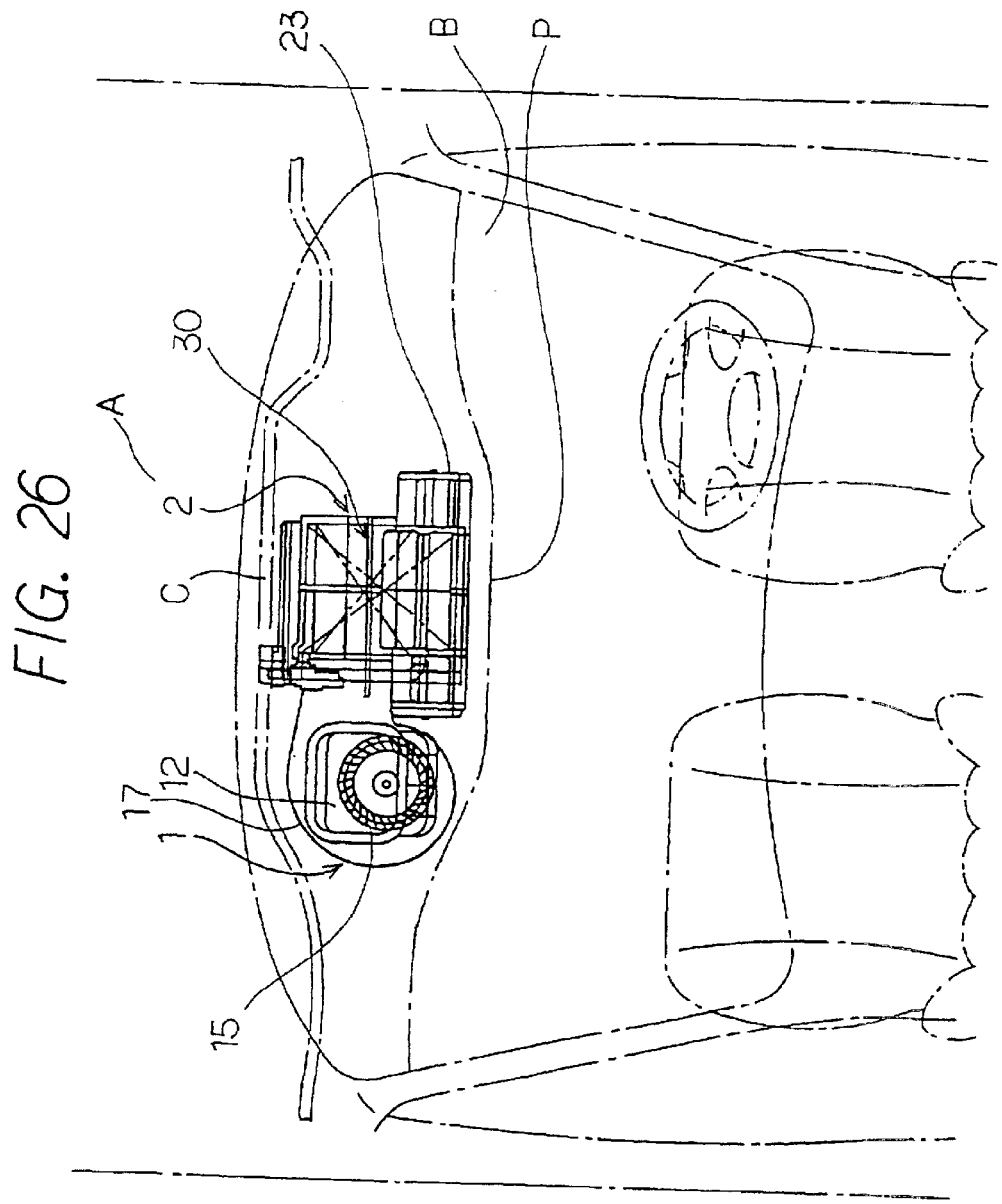
FIG. 26 is a plan view of an automotive air conditioner according to an eighth embodiment.

Referring to FIG. 26, an engine compartment A and a passenger compartment B is partitioned by a partition C (generally referred as a "fire wall" and made from an iron plate). A fan unit 1 of an air conditioner is so located as to be offset from the central portion of the dashboard P in the width direction of the vehicle (e.g., offset to the left wheel the vehicle has a right steering wheel).

Figure 27:
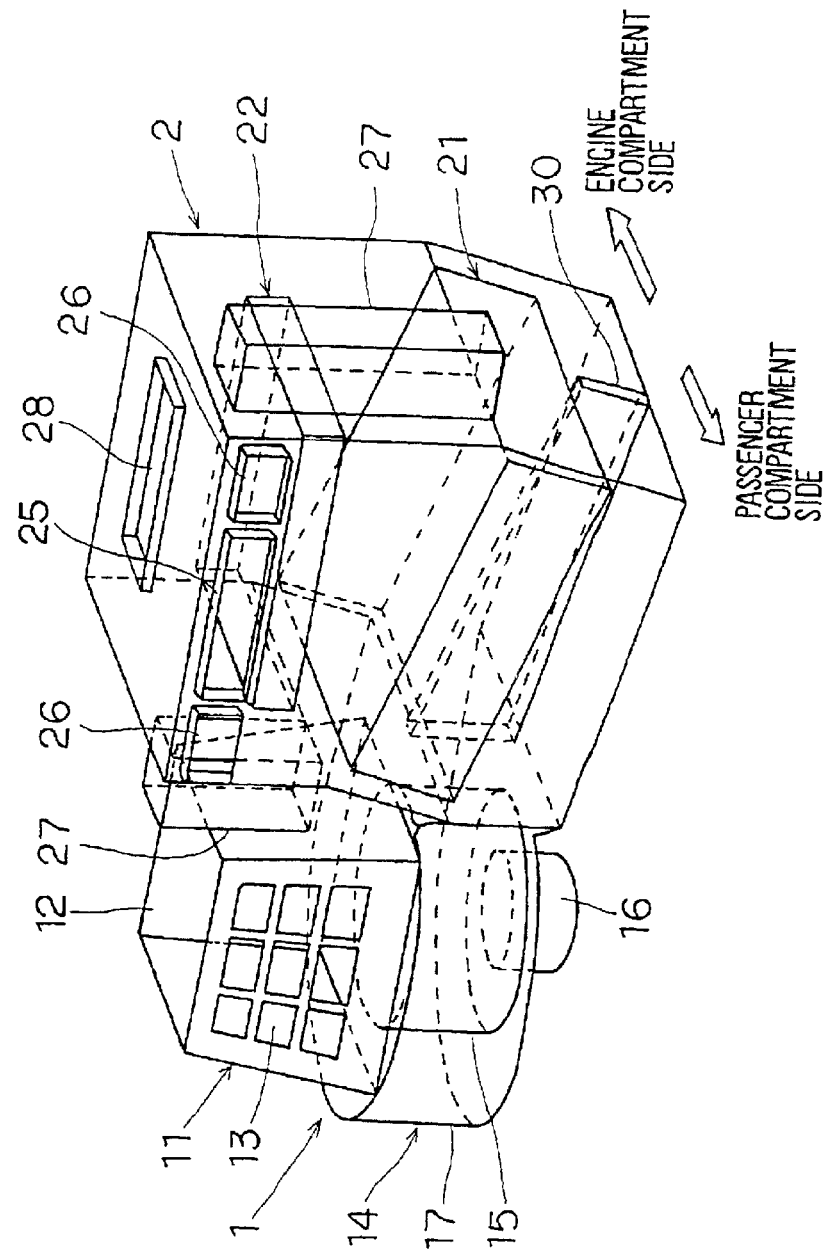
FIG. 27 is a perspective view of the automotive air conditioner according to the eighth embodiment.

As shown in FIG. 27, the fan unit 1 has at its upper portion an internal air/external air selector housing 11 for selectively introducing air inside the passenger compartment and air outside the passenger compartment. The internal air/external air selector housing 11 is formed with an external air inlet 12 for introducing the external air and an internal air inlet 13 for introducing the internal air. Inside the internal air/external air selector housing 11, there is provided an internal/external air selector door (not shown) for opening or closing the external air inlet 12 and the internal air inlet 13.

A blower 14 is provided below the internal air/external air selector housing 11. The blower 14 is composed of a centrifugal multiblade fan (scirocco fan) 15, a fan driving motor 16, and a scroll casing 17.

A rotary shaft of the fan 15 is so arranged as to direct in a substantially vertical direction. The air sucked by rotation of the fan 15 from the internal air/external air selector housing 11 through a bellmouth shaped air inlet 18 (see FIG. 30) formed at an upper portion of the scroll casing 17 is directed toward an outlet of the scroll casing 17 in a substantially horizontal direction (from the left to the right in the passenger compartment B as understood from FIG. 26).

As shown in FIG. 26, an air conditioner unit 2 incorporating an air conditioning heat exchanger which will be described later is located at the central portion of the dashboard P in the passenger compartment B in the width direction of the vehicle. In the air conditioning unit 2, an evaporator (cooling heat exchanger) 21 of a refrigeration cycle is located substantially horizontally, and the air directed from the fan unit 1 enters the evaporator 21 from its lower side.

Figure 28:
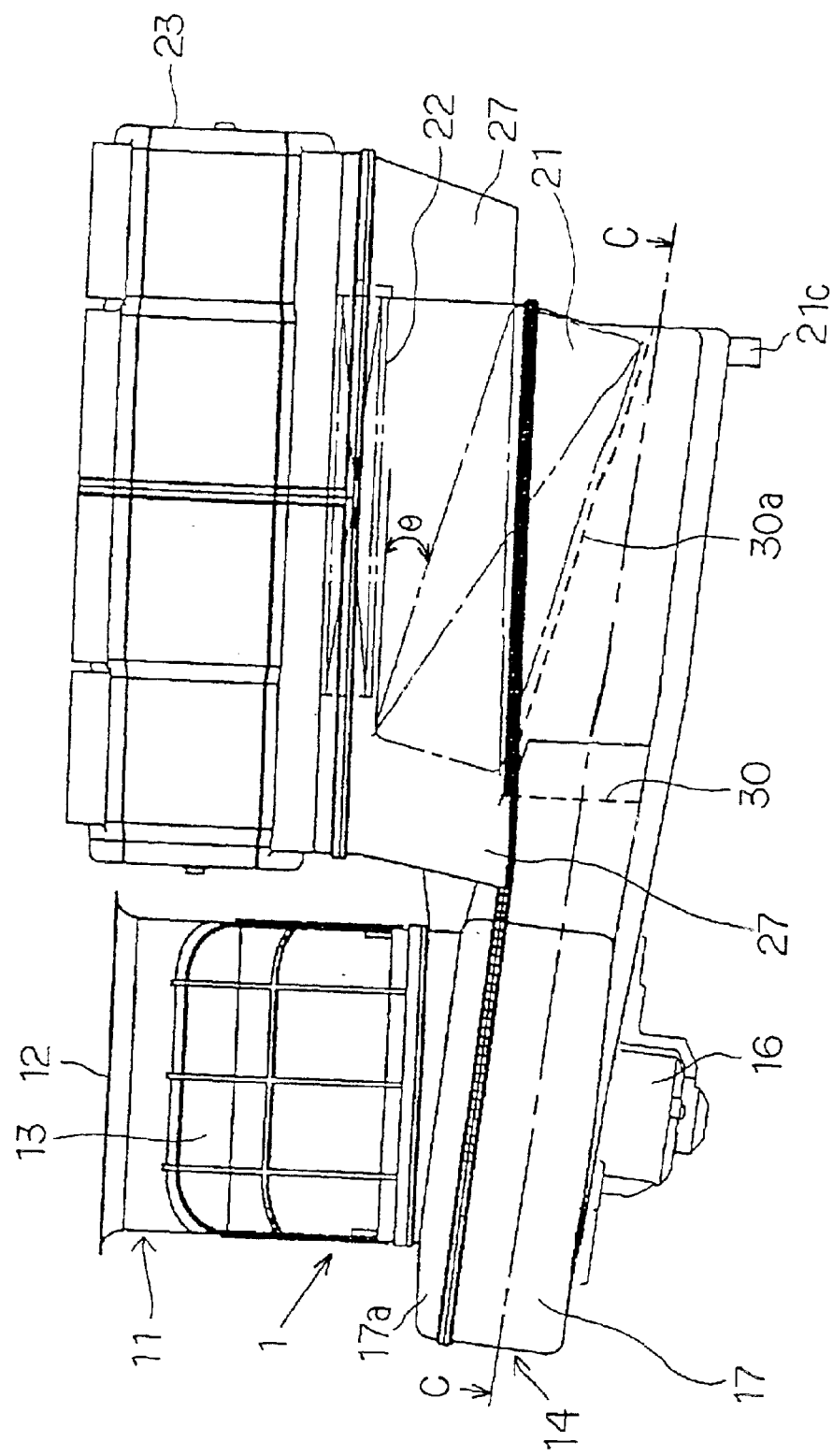
FIG. 28 is a front view of an automotive air conditioner according to the eighth embodiment.

As shown in FIGS. 27 and 28, a heater core (heating heat exchanger) 22 is located substantially horizontally on the downstream side of the evaporator 21 with respect to the airflow direction (on the upper side in the passenger compartment). The heat core 22 utilizes an engine cooling water (hot water) as a heat source. A blow mode selector 23 (see FIG. 28) is located on the upper side of the heat core 22 in the passenger compartment (on the downstream side of the heater core 22).

In this embodiment, there is provided a hot water flow control valve 24 (see FIG. 40) for controlling a hot water flow to the heater core 22 as temperature control means for controlling temperature of conditioned air, so that the hot water flow to the heater core 22 is controlled by the hot water flow control valve 24 to thereby adjust an amount of heat of air by the heater core 22 and control a temperature of air to be supplied into the passenger compartment.

The blow mode selector 23 is provided to select a blow mode of air to be supplied into the passenger compartment. The selecting member 23 includes a center face air passage 25 communicated with a center face (upper) air outlet (not shown) for discharging air toward the head of a passenger in the passenger compartment, two side face air passages 26 communicated with two side face air outlets (not shown) for discharging air toward the head of the passenger from the right and left sides thereof, two foot air passages 27 communicated with two foot (lower) air outlets (not shown) for discharging air toward the feet of the passenger, and a defroster air passage 28 communicated with a defroster air outlet (not shown) for discharging air toward a windshield. The blow mode selector 23 further includes door means (a plate door, a rotary door having a cylindrical outer peripheral surface, or a film door) for selectively opening or closing these air passages 25, 26, 27, and 28.

The blow mode selector 23 may have a known structure, and the detailed description thereof will be omitted herein. However, in brief, the blow mode selector 23 has a cylindrical shape extending laterally (in the right-left direction) as shown in FIG. 28. A rotary door (not shown) is rotatably provided in the blow mode selector 23 and has a cylindrical outer peripheral surface in which openings are defined to allow for the passage of the air. By selecting a rotational position of the rotary door, the air passages 25, 26, 27, and 28 are selectively opened or closed to select a desired one of a plurality of blow modes including a face blow mode, a bi-level blow mode, a foot blow mode, a defroster blow mode, and a combined foot and defroster blow mode. In FIG. 27, the blow mode selector 23 is not shown for simplicity of illustration.

The evaporator 21 is slightly inclined with respect to horizontal plane, so as to improve the drainage of condense water generated by the cooling operation. That is, as show in FIGS. 27 and 28, the evaporator 21 is inclined downward at its one end (in the right direction in FIG. 28) corresponding to the forward end of the flow of air directed to the lower side of the evaporator 21 by the blower 14.

An angle $\theta$ of inclination of the evaporator 21 is set to preferably 10 to 30 degrees to reduce an amount of water retained in the evaporator 21 itself.

Figure 30:
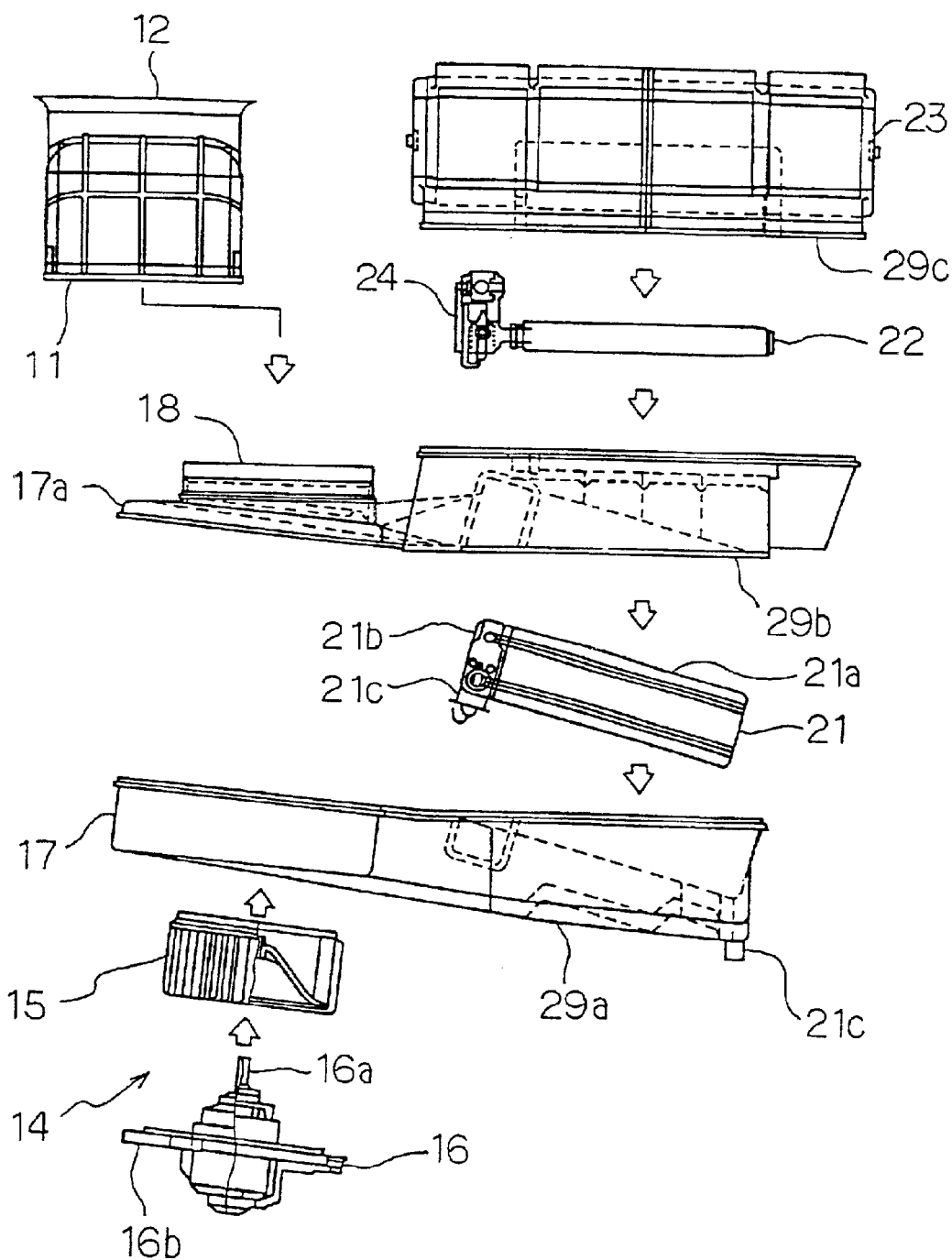
FIG. 30 is a disassembled view of the air conditioner of the eighth embodiment.

The evaporator 21 is of a known laminated type such the its core portion is formed by laminating a plurality of metal thin plates of aluminum or the like which are superior in heat conductivity and corrosion resistance in a direction perpendicular to the sheet plane of FIG. 30 to construct a plurality of tubes 21a, and by interposing a corrugated fin (not shown) between each adjacent pair of the plurality of tubes 21 as shown in FIG. 30, a tank portion 21b for distributing a refrigerant to the tubes 21a and collecting the refrigerate from the tubes 21a is provided at one end of the evaporate 21. Further, a thermal type expansion valve 21c is provided adjacent to the tank portion 21b and reduces the pressure the refrigerant flowing into the evaporator 21 to expand the refrigerant.

The tubes 21a of the evaporator 21 extend in the same direction as the flowing direction of the air from the blower 14 (from the left to the right in FIG. 28). Accordingly, the condensed water is forced by the air flow to smoothly flow on the surfaces of the tubes 21a to the lower end of the inclined evaporator 21 (the right end in FIG. 28).

The condensed water generated in the evaporator 21 is discharged from a condensed water drain pipe 21d provided below the lower end of the inclined evaporator 21 on the lower side thereof (on the upstream side of the evaporator 21). The pipe 21d is integrally formed with a resin lower case 29a (see FIG. 30) of resin at its lowermost portion.

An air guide plate 30 is located below the evaporator 21, that is, on the upstream side of the evaporator 21, in such a manner as to extend along the air flow from the blower 14. In this embodiment, the air guide plate 30 is integrally formed with the resin lower case 29a. As will be described later, the air guide plate 30 serves to uniform an air blow speed distribution of air passing through the evaporator 21 in the longitudinal direction of the vehicle.

As shown in FIG. 28, an upper surface 30a of the air guide plate 30 is inclined along the inclined lower surface of the evaporator 21. The inclined upper surface 30a of the air guide plate 30 is in contact with the inclined lower surface of the evaporator 21 to thereby support the evaporator 21. The air passage formed below the evaporator 21 is partitioned into two independent passages by the air guide plate 30.

FIG. 30 shows a structure where the apparatus is assembled in this embodiment. The fan 15 of the blower 14 is integrally connected to a rotary shaft 16a of the motor 16, and then inserted into the scroll casing 17 formed integrally with the resin lower case 29a. In this condition, the motor 16 is fixedly mounted at its flange portion 16b to the scroll casing 17.

The evaporator 21 is placed on an mounting surface of the lower case 29a, and a resin intermediate case 29b is put on the lower case 29a so as to sandwich the evaporator 21. Thus, the evaporator 21 is fixed between the lower case 29a and the intermediate case 29b.

An upper cover portion 17a of the scroll casing 17 is formed integrally with the intermediate case 29b. The upper cover portion 17a has the bellmouth shaped air inlet 18 described above. The internal air/external air selector housing 11 is located on the bellmouth shaped air inlet 18 and integrally mounted thereto.

The heater core 22 and the hot water flow control valve 24 are placed on a mounting surface of the intermediate case 29b, and a resin upper case 29c is put on the intermediate case 29b so as to sandwich the heater core 22 and the hot water flow control valve 24. Thus, the heater core 22 and the hot water flow control valve 24 are fixed between the intermediate case 29b and the upper case 29c.

The upper case 29c is provided with the blow mode selector 23, center face air passage 25, side face air passages 26, foot air passages 27, and defroster air passage 28. Further, the rotary door (not shown) is built in the upper case 29c.

The cases 29a, 29b, and 29c and the internal air/external air selector housing 11 are detachably connected by using metal clips having elasticity or screws.

An operation of the eighth embodiment having the above structure will now be described.

Referring to FIGS. 27 and 28, the air flowing into the internal air/external air selector housing 11 is directed into the scroll casing 17 by the fan 15, and flows substantially horizontally in the scroll casing 17 to the lower side of the evaporator 21. Then, the air is dehumidified and cooled in the evaporator 21, and flows upward to enter the heater core 22, in which the air is heated.

In this embodiment, the hot water flow control valve 24 for controlling the amount of hot water to be supplied to the heater core 22 is used as conditioned air temperature control means. That is, a so-called flow control reheat system is adopted to obtain a desired blow air temperature by controlling the amount of hot water in the hot water flow control valve 24. The conditioned air reheated to a desired temperature in the heater core 22 is distributed to a predetermined air passage selected by the rotary door of the blow mode selector 23 in the upper case 29c.

With the above configuration of the embodiment, the following effects can be obtained.

(1) Because the evaporator 21 and the heater core 22 are located substantially horizontally and laminated vertically (one above the other), a vertical space for the heat exchanger can be greatly reduced. As a result, the vertical dimension of the air conditioning unit can be made sufficiently smaller than that of the conventional center-layout unit. Further, since it is unnecessary to provide blowing ducts on the front and rear sides of the heat exchanger, the dimension in the longitudinal direction of the vehicle can also be reduced. Thus, the air conditioning unit can be made greatly compact, and it can be easily installed in the passenger compartment.

(2) Since most of the components of the air conditioning unit have such shapes as to be assembled vertically as shown in FIG. 30, the air conditioning unit can be easily assembled by one-directional assembling such that the components are vertically laminated, so that the number of the assembling steps in the mass-production can be reduced.

(3) Since the evaporator 21 is inclined downward at its one end corresponding to the forward end of the flow of air directed from the blower 14, and the tubes 21a of the evaporator 21 extend along the air flow (in the left-right direction in FIGS. 27 and 28), the condensed water in the evaporator 21 is forced by the air flow to smoothly flow on the surfaces of the tubes 21a, is collected at the end of the inclined evaporator 21 (the right end in FIGS. 27 and 28), and drops.

Then, the condensed water is discharged from the drain pipe 21d located below the lower end of the inclined evaporator 21. Thus, the condensed water can be smoothly discharged from the evaporator 21.

(4) Because the condensed water in the evaporator 21 drops to the upstream side thereof, the condensed water is warmed by the hot air before cooled. Accordingly, the temperature of the outer surface of the lower case 29a is not so decreased, and as a result, droplet on the lower case 29a can be greatly reduced or eliminated. In this way, it is unnecessary to provide a heat insulator usually mounted inside a case.

(5) By installing the air guide plate 30, the air blow speed distribution of air passing through the evaporator 21 in the longitudinal direction of the vehicle can be uniformed. An effect of the air guide plate 30, which is a main feature of the present invention, will now be described.

Figure 29:
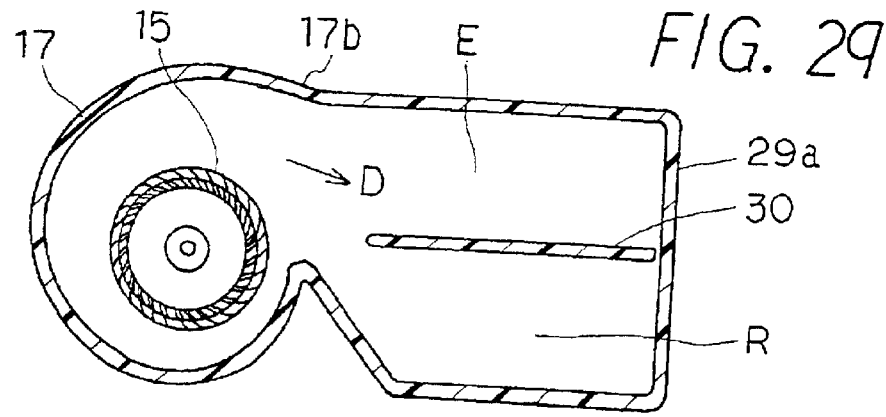
FIG. 29 is a sectional view taken along the line C—C of FIG. 28.

FIG. 29 is a cross section taken along the line C—C in FIG. 28. Referring to FIG. 29, a winding end portion 17b of the scroll casing 17 of the blower 14 is connected to a portion of the lower case 29a below the evaporator 21, and a connecting portion between the winding end portion 17b and the lower case 29a extends substantially parallel to the width direction of the vehicle (see FIG. 26).

As shown in FIG. 26, the air guide plate 30 is so arranged as to extend substantially parallel to the width direction of the vehicle. A flowing direction D of air directed from the winding end portion 17b of the scroll casing 17 is coincident with a direction of a tangent to the winding end portion 17b, and the flowing direction D is headed for a region R on the side of the passenger compartment in the lower case 29a.

If the air guide plate 30 is not provided, the air blow speed distribution of air passing through the evaporator 21 in the longitudinal direction of the vehicle may become nonuniform such that the air blow speed in the region R on the side of passenger compartment is higher than that in the region E on the side of the engine compartment. Such a nonuniform air blow speed distribution causes problems in deterioration of the heat exchanging efficiency in the evaporator 21.

Figure 31:
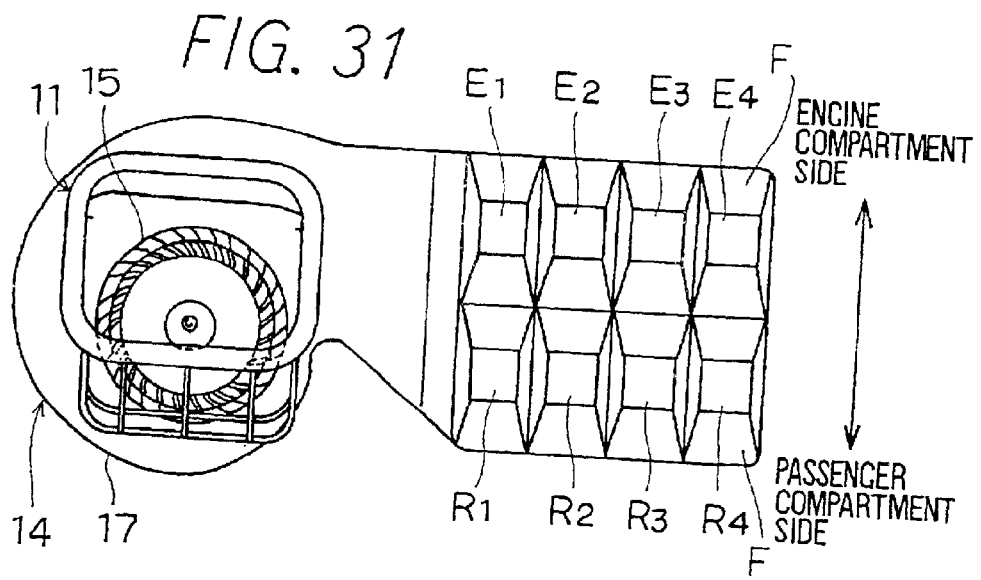
FIG. 31 is a plane view showing an experimental device on both a comparison sample and the eighth embodiment.
Figure 32:
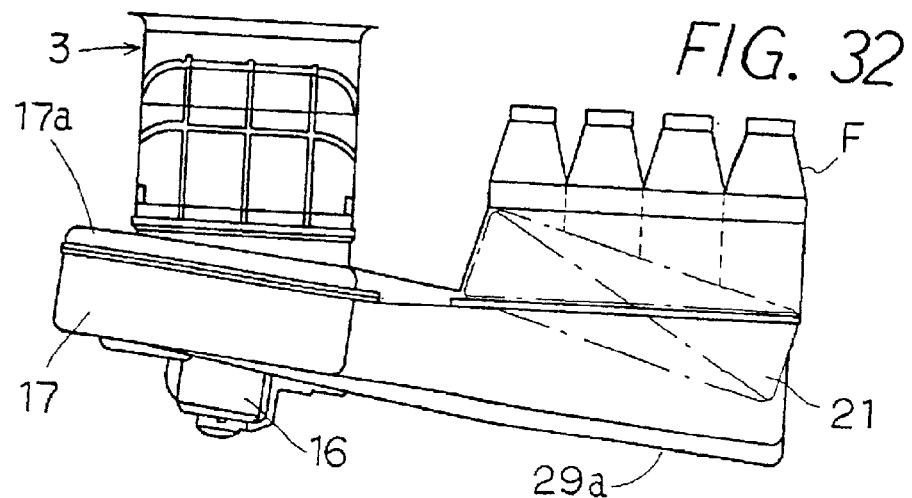
FIG. 32 is a front view of the experimental device.

The inventors measured the above air blow speed by using an experimental device shown in FIGS. 31 and 32 on both a comparison sample without having the air guide plate 30 and this embodiment having the air guide plate 30.

The experimental device shown in FIGS. 31 and 32 is constructed by removing the heater core 22 and the like on the downstream side of the evaporator 21 and placing an air blow speed measuring duct F divided into eight portions. In FIG. 31, E1 to E4 denote four openings on the side of engine compartment, of the air blow speed measuring duct F, and R1 to R4 denote four opening portions on the side of the passenger compartment.

TABLES 1A and 1B show the results of measurement of the air blow speed by using the above experimental device, in which TABLE 1 shows the result of the comparison sample without having the air guide plate 30, and TABLE 2 shows the result of this embodiment having the air guide plate 30. In TABLE IA and 1B, portions 1–4 respectively correspond to the numerals 1–4 given to each opening portion. The blower 14 is operated by applying voltage of 12 V to the driving motor 16.

TABLE 1

AIR BLOW SPEED DISTRIBUTION WITHOUT AIR GUIDE PLATE

| | PORTION | | | |
|---|---|---|---|---|
| | 1 | 3 | 3 | 4 |
| ENGINE COMP. SIDE (E) | 4.9 | 7.5 | 8.6 | 9.1 |
| PASSENGER COMP. SIDE (R) | 5.9 | 7.9 | 8.9 | 9.5 |
| ENGINE SIDE AVERAGE SPEED | | 7.5 | | |
| PASSENGER COMP. SIDE AVERAGE SPEED | | 8.1 | | |
| ENGINE SIDE/PASSENGER COMPARTMENT SIDE = 0.92 | | | | |

TABLE 2

AIR BLOW SPEED DISTRIBUTION WITH AIR GUIDE PLATE (ONE PLATE)

| | PORTION | | | |
|---|---|---|---|---|
| | 1 | 3 | 3 | 4 |
| ENGINE COMP. SIDE (E) | 5.3 | 7.8 | 8.8 | 9.6 |
| PASSENGER COMP. SIDE (R) | 5.5 | 7.6 | 8.3 | 9.3 |
| ENGINE SIDE AVERAGE SPEED | | 7.9 | | |
| PASSENGER COMP. SIDE AVERAGE SPEED | | 7.7 | | |
| ENGINE SIDE/PASSENGER COMPARTMENT SIDE = 0.97 | | | | |

In the comparison sample without having the air guide plate 30, the air velocities at opening portions R1 to R4 on the side of the engine compartment are higher than those at opening portions E1 to E4 on the' side of the passenger compartment, for the aforementioned reason. As shown in TABLE 1A, an average air blow speed on the side of the engine compartment is 7.5 m/s, and an average air blow speed on side of the passenger compartment is 8.1 m/s. Accordingly, the ratio between the average air blow speed on the engine compartment side and the average air blow speed on the passenger compartment side becomes 7.5/8.1= 0.92.

To the contrary, according to this embodiment having the air guide plate 30, the flowing direction D of air directed from the winding end portion 17b of the scroll casing 17 toward the region R on the side of the passenger compartment can be changed toward the region R on the side of the engine compartment. Accordingly, as shown in TABLE 1B, the average air blow speed on the side of the engine compartment and the average air blow speed on the side of the passenger compartment can approach each other so that the average air blow speed on the side of the engine compartment is increased up to 7.9 m/s and the average air blow speed on the side of the passenger compartment is decreased down to 7.7 m/s. Accordingly, the ratio between the average air blow speed on the side of the passenger compartment and the average air blow speed on the side of the engine compartment becomes 7.7/7.9=0.97. Thus, the difference between the two average air velocities can be reduced to a minute value around an error.

The flowing direction D of air from the winding end portion 17b of the scroll casing 17 cannot be changed toward the region E on the side of the engine compartment, because it may cause problems such as a deterioration of the performance of the blower and an increase of the installation space in the passenger compartment.

(Embodiment 9)

Figure 33:
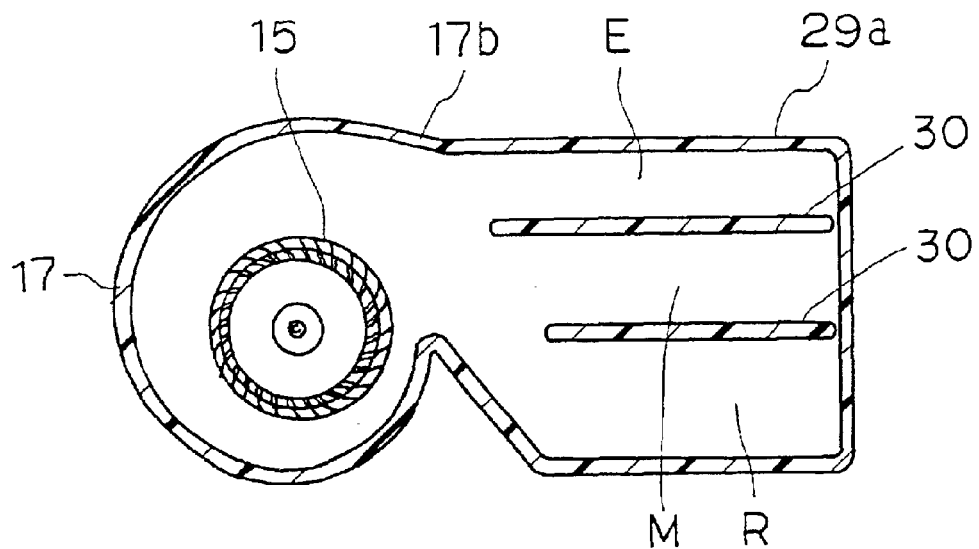
FIG. 33 is a sectional view showing a main portion of a ninth embodiment.

FIG. 33 shows a ninth embodiment of the present invention. In this embodiment, two air guide plates 30 are provided to partition the air passage below the evaporator 21 into three independent regions (passages) E, M, and R. The other configuration is the same as that of the eighth embodiment.

(Embodiment 10)

Figure 34:
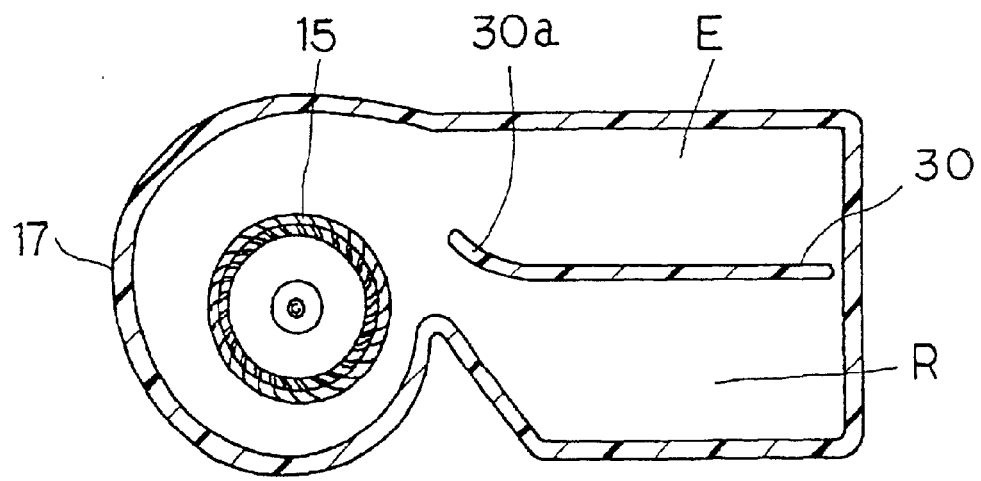
FIG. 34 is a sectional view showing a main portion of a tenth embodiment.

FIG. 34 shows a tenth embodiment of the present invention. In this embodiment, a gently curved portion 30a along the air flow from the centrifugal fan 15 is formed at one end of the air guide plate 30 on the side of the centrifugal fan 15. By forming the curved portion 30a, the air from the centrifugal fan 15 can be more smoothly guided to the region E on the side of the engine compartment. Accordingly, turbulence or the like of the air flow due to the installation of the air guide plate 30 can be suppressed.

(Embodiment 11)

In the eighth to tenth embodiments, the evaporator 21i: inclined downward at its one end corresponding to the forward end of the air flow below the evaporator 21, so that the aii flows obliquely from the evaporator 21 into the heater core 22. As a result, there occur variations in air blow speed distribution in the width direction of the heater core 22 (in the width direction of the vehicle). That is, there occurs an air blow speed distribution such that an air blow speed of air passing through the heater core 22 becomes higher toward the lower end of the inclined evaporator 21 (toward the right side in FIG. 35).

Furthermore, the variations in air blow speed cause variations in heat exchanging amount in the left and right portions of the heater core 22, thus resulting in variations in temperature of the blow air. Accordingly, a feeling of the conditioned air by the air conditioner becomes non-uniform in the left side and the right side in the passenger compartment, because of these variations in air blow speed and temperature of the air, thus causing a deterioration in feeling of conditioned air.

Figure 35:
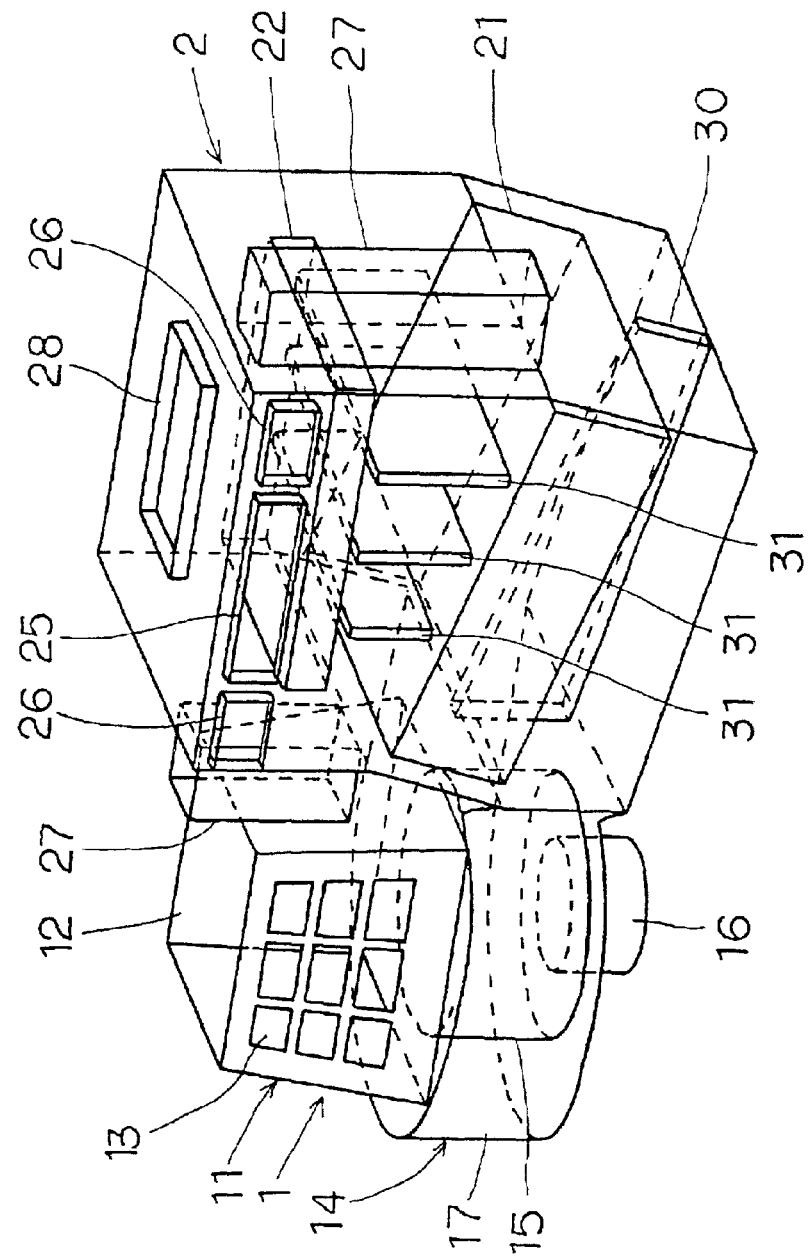
FIG. 35 is a perspective view showing a eleventh embodiment.

In view of the above problem, in the fourth embodiment, as shown in FIG. 35, a plurality of air distributing plates 31 is provided in an air passage formed between the evaporator 21 and the heater core 22, so as to uniform the air blow speed distribution in the width direction of the vehicle.

More specifically, the air distributing plates 31 are arranged at intervals so as to be perpendicular to am air receiving surface of the heater core 22, and the intervals of the plural (three in this embodiment) plates 31 are set equal to each other. The air distributing plates 31 are formed integrally with the resin case of the air conditioning unit 2, more specifically, with the intermediate case 29b. Accordingly, the air distributing plates 31 can be formed simply at a low cost.

In the eleventh embodiment, the air passed through the evaporator 21 is forcibly guided by the air distributing plates 31 located just downstream of the outlet of the evaporator 21, and then flows normally to the air receiving surface of the heater core 22. Accordingly, variations in air blow speed distribution in the width direction of the heater core 22 can be greatly reduced to uniform the air blow speed distribution in the heater core 22.

(Embodiment 12)

The twelfth embodiment is intended both to uniform an air blow speed distribution of air flowing into the evaporator 21 in the longitudinal direction of the vehicle by using the air guide plate 30 and to uniform an air blow speed distribution of air flowing into the evaporator 21 in the width direction of the vehicle.

Since the air directed from the blower 14 of -the fan unit 1 flows substantially horizontally below the evaporator 21 and then changes its direction to a substantially vertical direction so as to enter the evaporator 21, the air blow speed at the forward end of the air flow below the evaporator 21 (the right end in FIG. 36) becomes higher than that at the other area.

The air guide plate 30 is formed integrally with the resin case located below the evaporator 21, more specifically, with the lower case 29a, and a stepped concave and convex surface 32 is further formed integrally with the lower case 29a, thereby making uniform the air blow speed distributions in the evaporator 21 both in the longitudinal direction of the vehicle and in the width direction of the vehicle.

Figure 36:
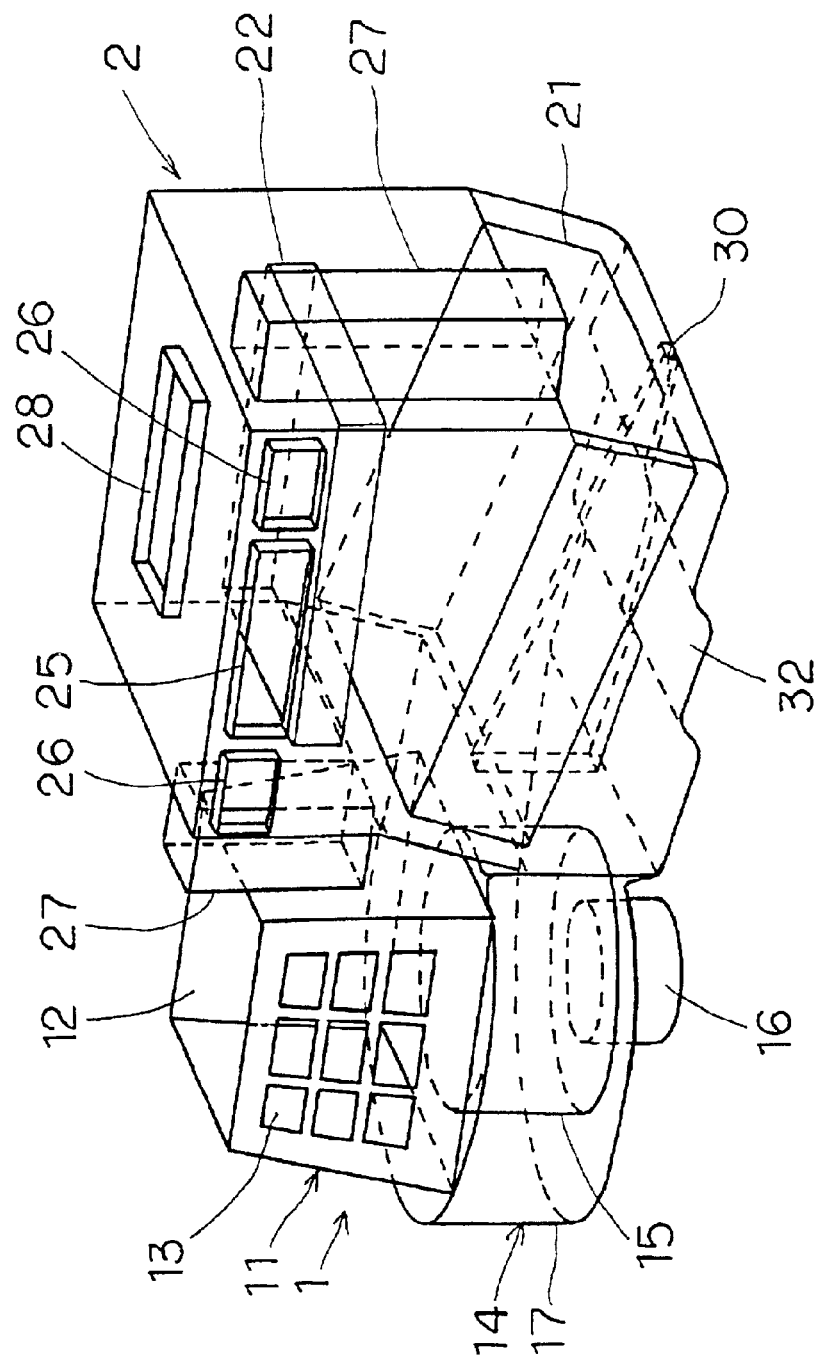
FIG. 36 is a perspective view showing a twelfth embodiment.

The stepped concave and convex surface 32 extends in a direction (the longitudinal direction of the vehicle) perpendicular to the direction of the air flow from the blower 14 (the width direction in FIG. 36). In this embodiment shown in FIG. 36, the stepped concave and convex surface 32 is formed as a two-stepped surface having upper surfaces and lower surfaces. According to an experimental result by the inventors, it has become apparent that the height of each step between the adjacent upper and lower surfaces is preferably set to about 15 to 20 mm to uniform the air blow speed distribution.

The evaporator 21 is not limited to the aforementioned laminated type, but any other types may be adopted. For example, the evaporator 21 may be of a serpentine type in which a multihole flat tube is meanderingly bent and a corrugated fin is combined with the bent tube.

(Embodiment 13)

Figure 37:
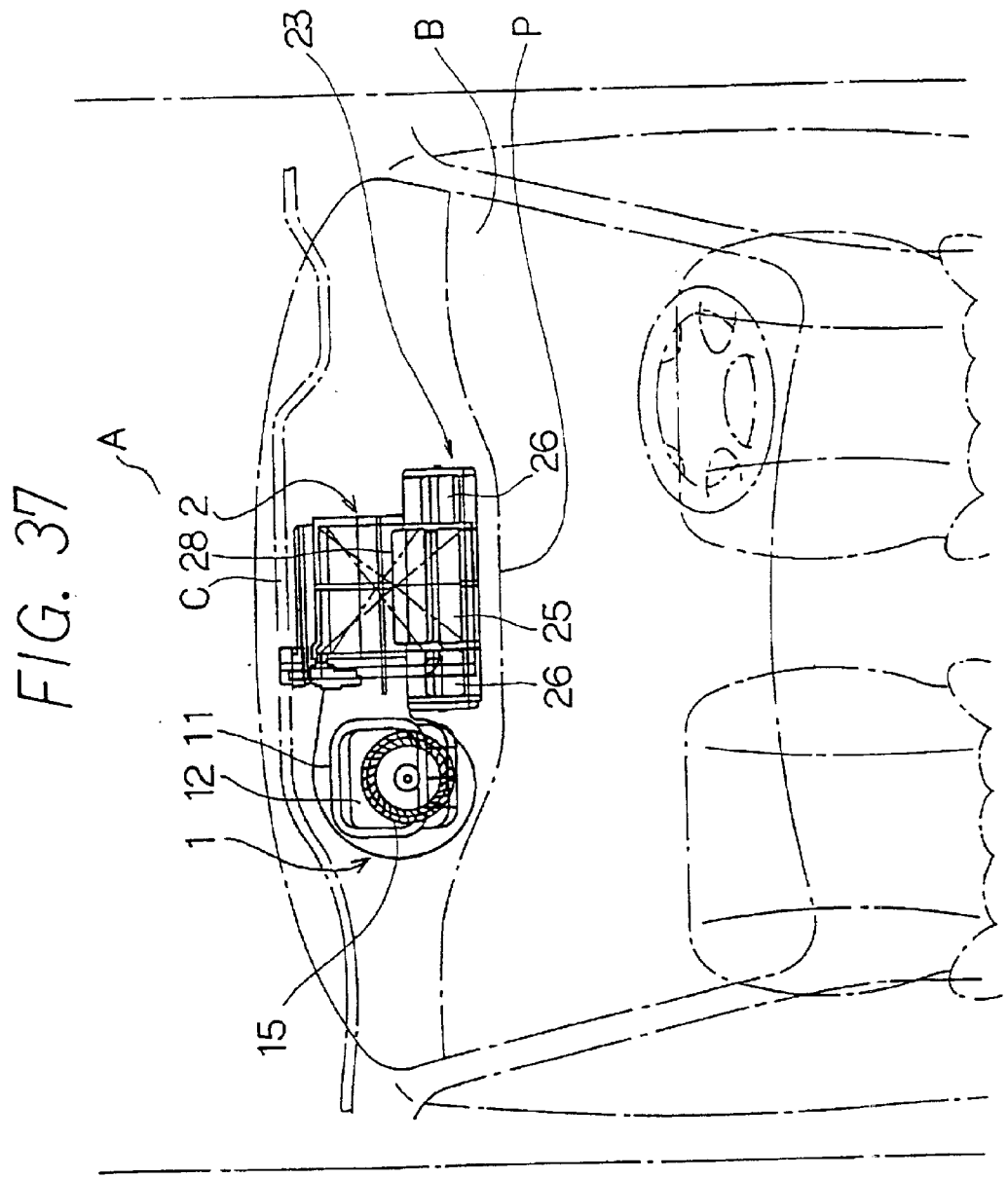
FIG. 37 is a schematic view, in plane, showing the air conditioner of a thirteenth embodiment mounted within a vehicle.

FIGS. 37 to 43 show a thirteenth embodiment of the present invention applied to an air conditioner for an automobile. Referring to FIG. 37, an engine compartment A and a passenger compartment B is partitioned by a partition C (generally referred as a "fire wall" and made from an iron plate). A fan unit 1 of an air conditioner is so located as to be offset from the central portion of the dashboard P in the width direction of the vehicle (e.g., offset to the left wheel the vehicle has a right steering wheel).

Figure 38:
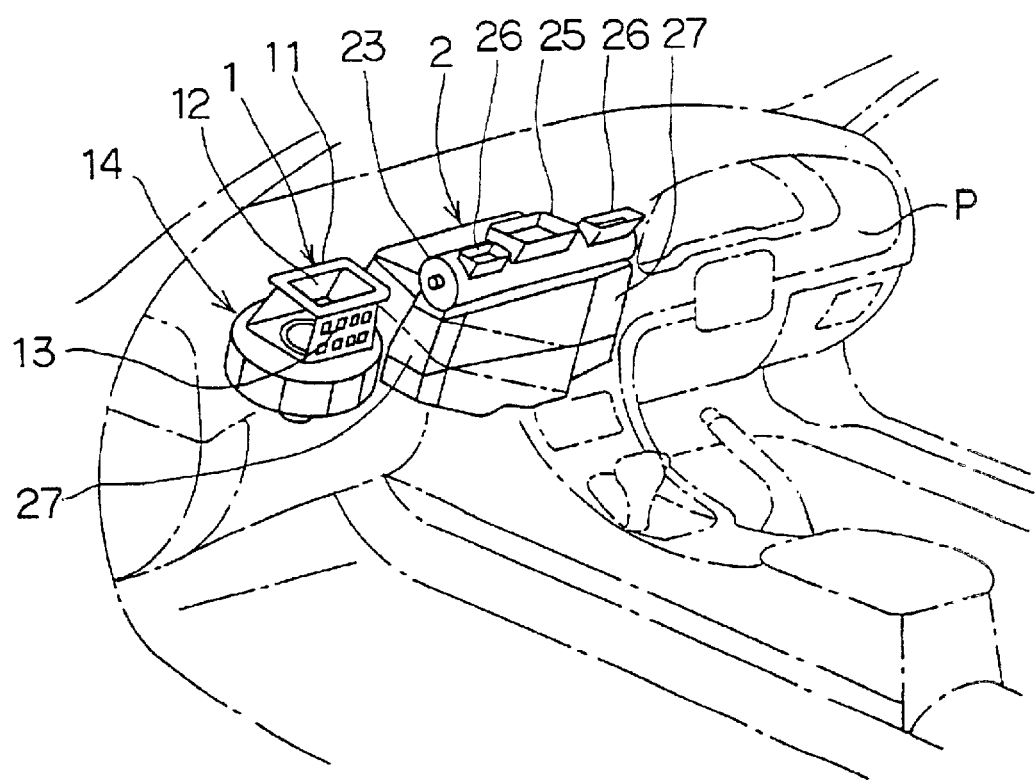
FIG. 38 is a schematic view, in perspective, showing the air conditioner of the thirteenth embodiment mounted within the vehicle.
Figure 39:
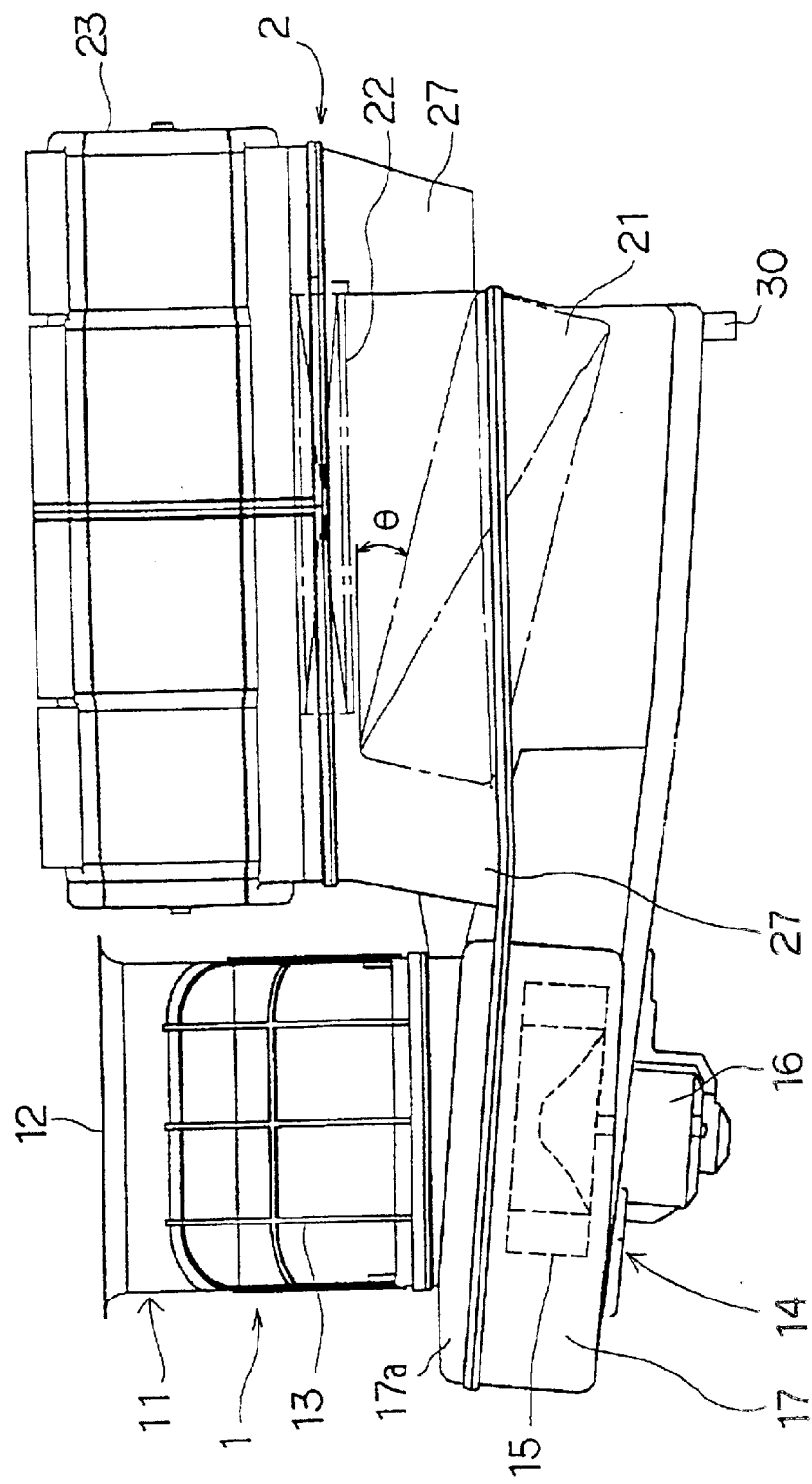
FIG. 39 is a front view of the thirteenth embodiment.

As shown in FIG. 38 and 39, the fan unit 1 has at its upper portion an internal air/external air selector housing 11 for selectively introducing air inside the passenger compartment and air outside the passenger compartment. The internal air/external air selector housing 11 is formed with an external air inlet 12 for introducing the external air and an internal air inlet 13 for introducing the internal air. Inside the internal air/external air selector housing 11, there is provided an internal/external air selector door (not shown) for opening or closing the external air inlet 12 and the internal air inlet 13.

As shown in FIGS. 38 and 39, the fan unit 1 has at its upper portion an internal air/external air selector housing 11 for selectively introducing air internal the passenger compartment and air outside the passenger compartment. The internal air/external air selector housing 11 is formed with an external air inlet 12 for introducing the internal air and an internal air inlet 13 for introducing the external air. Inside the internal air/external air selector housing 11, there is provided an internal air/external air selector door (not shown) for opening and closing the external air inlet 12 and the internal air inlet 13.

A blower 14 is provided below the internal air/external air selector housing 11. The blower 14 is composed of a centrifugal multi-blade fan (scirocco fan) 15, a fan motor 16, and a scroll casing 17.

A rotary shaft of the fan 15 is so arranged as to direct in a substantially vertical direction: The air sucked by rotation of the fan 15 from the internal air/external air selector housing 11 through a bellmouth shaped air inlet 18 (see FIG. 41) formed at an upper portion of the scroll casing 17 is directed toward an outlet of the scroll casing 17 in a substantially horizontal direction (from the left to the right in the passenger compartment B as understood from FIGS. 37 and 38).

As shown in FIGS. 37 and 38, an air conditioner unit 2 incorporating an air conditioning heat exchanger which will be described later is located at the central portion of the dashboard P in the passenger compartment B in the width direction of the vehicle. In the air conditioning unit 2, an evaporator (cooling heat exchanger) 21 of a refrigeration cycle is located substantially horizontally. The air directed from the fan unit 1 enters the evaporator 21 from its lower side, and flows upward.

As shown in FIGS. 38 and 39, a heater core (heating heat exchanger) 22 is located substantially horizontally on the downstream side of the evaporator 21 with respect to the airflow direction (on the upper side in the passenger compartment). The heat core 22 utilizes an engine cooling water (hot water) as a heat source. A blow mode selector 23 (see FIG. 39) is located on the upper side of the heat core 22 in the passenger compartment (on the downstream side of the heater core 22).

In this embodiment, there is provided a hot water flow control valve 24 (see FIG. 40) for controlling a hot water flow to the, heater core 22 as temperature control means for controlling temperature of conditioned air, so that the hot water flow to the heater core 22 is controlled by the hot water flow control valve 24 to thereby adjust an amount of heat of air by the heater core 22 and control a temperature of air to be supplied into the passenger compartment.

The blow mode selector 23 is provided to select a blow mode of air to be supplied into the passenger compartment. The blow mode selector 23 includes a center face air passage 25 communicated with a center face (upper) air outlet (not shown) for discharging air toward the head of a passenger in the passenger compartment, two side face air passages 26 communicated with two side face air outlets (not shown) for discharging air toward the head of the passenger from the right and left sides thereof, two foot air passages 27 communicated with two foot (lower) air outlets (not shown) for discharging air toward the feet of the passenger, and a defroster air passage 28 communicated with a defroster air outlet (not shown) for discharging air toward a windshield. As shown in FIG. 37, the defroster air passage 28 is located on the front side of the center face air passage 25 in the longitudinal direction of the vehicle. The blow mode selector 23 further includes door means (plate door, rotary door having a cylindrical outer peripheral surface, or film door) for selectively opening or closing these. air passages 25, 26, 27, and 28.

The blow mode selector 23 may have a known structure, and the detailed description thereof will be omitted herein. However, in brief, the blow mode selector 23 has a cylindrical shape extending laterally as viewed in FIG. 39. A rotary door (not shown) is rotatably provided in the blow mode selector 23 and has a cylindrical outer peripheral surface in which openings are defined to allow for the air passages. By selecting a rotational position of the rotary door, the air passages 25, 26, 27, and 28 are selectively opened or closed to select a desired one of a plurality of blow modes including a face blow mode, a bi-level blow mode, a foot blow mode, a defroster blow mode, and a combined foot and defroster blow mode.

The evaporator 21 is provided with a thermal type expansion valve 21a (see FIG. 41) as pressure reducing means for reducing the pressure of a refrigerant from a high-pressure refrigerant piping of a refrigeration cycle to thereby expand the refrigerant. The evaporator 21 is slightly inclined with respect to a horizontal plane, so as to improve the drainage of condensed water generated by the cooling operation. That is, as shown in FIG. 39, the evaporator 21 is inclined downward at its one end (right end as viewed in FIG. 39) corresponding to the forward end of the flow of air directed to the lower side of the evaporator 21 by the blower 14.

An inclination angle B of the evaporator 21 is set to preferably 10 to 30 degrees to .reduce an amount of water retained in the evaporator 21 itself.

Figure 42:
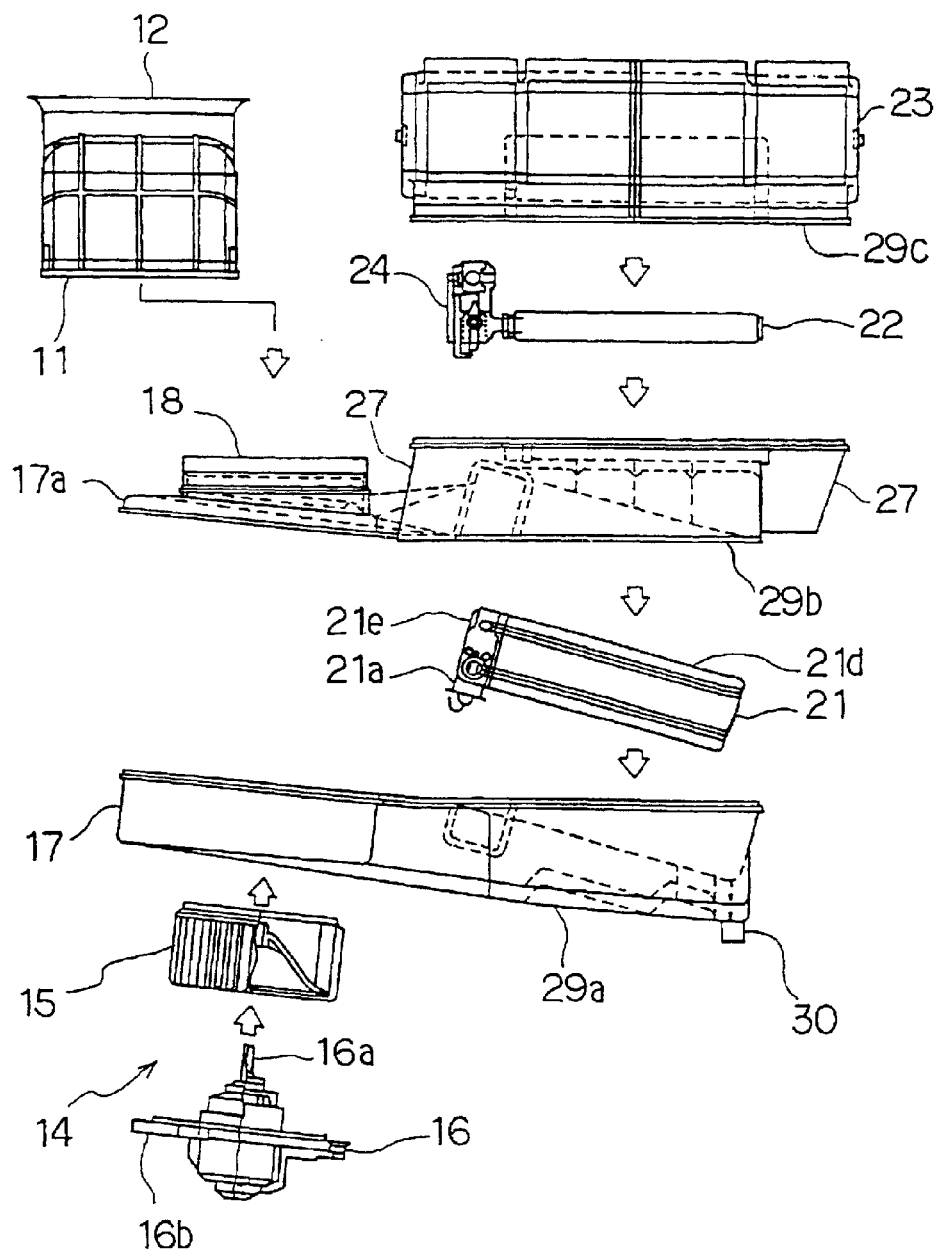
FIG. 42 is a perspective view showing an evaporator according to the thirteenth embodiment.

As shown in FIG. 42, the evaporator 21 is of a known laminated type such that its core portion 21$d$ is formed by laminating a plurality of metal thin plates of aluminum or the like which is superior in heat conductivity and corrosion resistance in a vertical direction in FIG. 42 to construct a plurality of tubes 21$b$, and by interposing a corrugated fin 21$c$ between each pair of adjacent tubes 21$b$.

A tank portion 21$e$ is provided at one end of the core portion 21$d$ to distribute the refrigerant to the tubes 21$b$ and collect the refrigerant from the tubes 21$b$. There is formed inside each tube 21$b$ a U-shaped refrigerant passage (see an arrow 21$f$ in FIG. 42) turned at the other end of the core portion 21$d$.

The tank portion 21$e$ is provided with a refrigerant inlet 21$g$ for introducing the refrigerant of two phases of gas and liquid reduced in pressure by the expansion valve 21$a$ and with a refrigerant outlet 21$h$ for discharging the refrigerant of gas evaporated in the core portion 21$a$.

Figure 40:
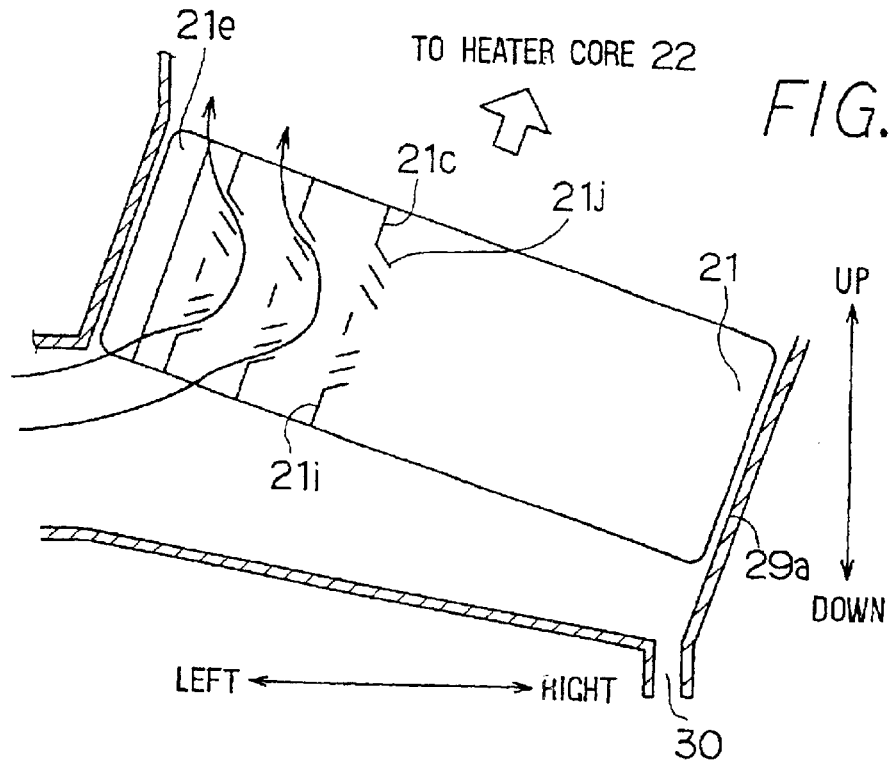
FIG. 40 is a sectional view showing a main portion of FIG. 39.

The tank portion 21$e$ is located at the upper end 6$f$ the inclined evaporator 21, and the tubes 21$b$ are so located as to extend in the same direction as the blowing direction of air directed from the blower 14 (the direction from the left to the right as viewed in FIGS. 39 and 40). Accordingly, the condensed water generated in the evaporator 21 is forced by the air flow from the blower 14 to smoothly flow on the surfaces of the tubes 21$b$ to the-lower end of the inclined evaporator 21 (the right end in FIGS. 39 and 40).

The condensed water generated in the evaporator 21 is discharged from a condensed water drain pipe 30 provided below the lower end of the inclined evaporator 21 on the upstream side of the evaporator 21. The drain pipe 30 is formed integrally with a lower case 29$a$ of resin (see FIG. 41) at its lowermost portion.

Figure 43:
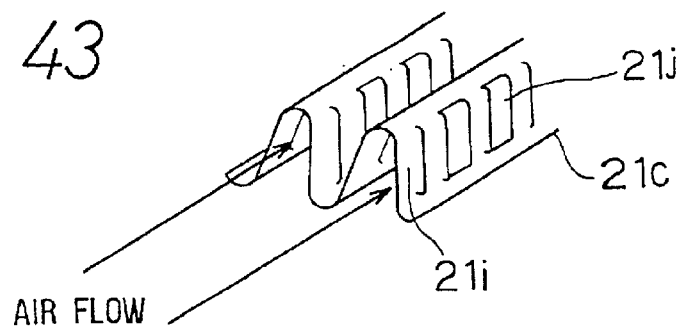
FIG. 43 is a partial perspective view showing a corrugated fin of the thirteenth embodiment.

As shown in FIGS. 40 and 43, the corrugated fin 21$c$ has a flat surface 21$i$ and a louver 21$j$ for guiding the air flow from the blower 14 obliquely with respect to the flat surface 21$i$. The louver 21$j$ is formed integrally with the flit surface 21$i$ by cutting and bending as by roller forming. The louver 21$j$ serves to cut off a thermal boundary layer in the flat surface 21$i$, thereby improving a heat transfer coefficient. In this embodiment, the louver 21$j$ is inclined vitt respect to the flat surface 21$i$ in adverse directions on the upstream side and the downstream side of the flat surface 21$i$. Accordingly, as shown in FIG. 40, the air flow in the evaporator 21 becomes V-shaped.

The direction of inclination of the louver 21$j$ to the flat surface 21$i$ is so set as to offset non-uniformity of air bloc speed distribution of air passed through the evaporator 21$i$~the width direction of the vehicle, as described later. More specifically, the direction of inclination of at least downstream portion of the lower 21$j$ is set so that the air flow at the downstream portion is directed toward the tank portion 21$e$.

Figure 41:
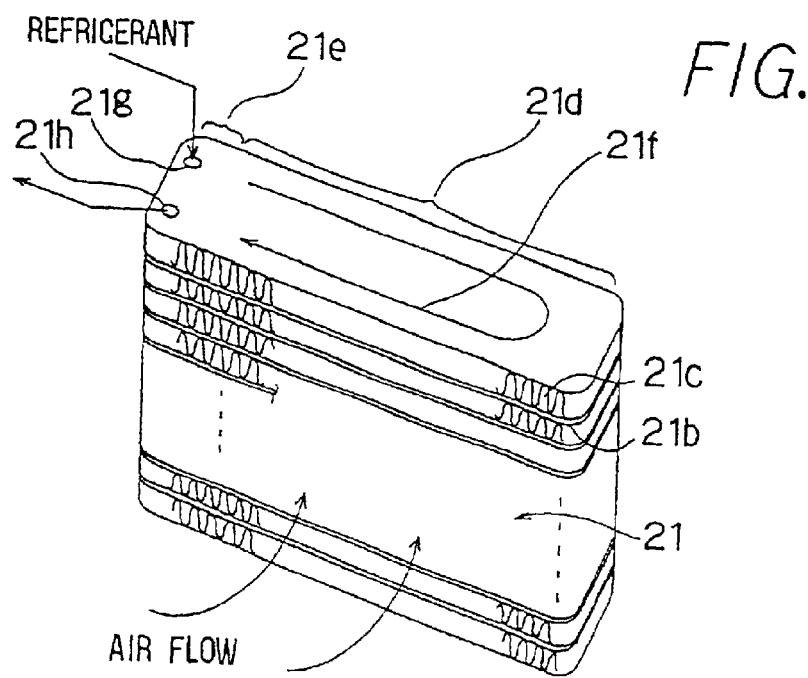
FIG. 41 is a disassembled view of the air conditioner of the thirteenth embodiment.

FIG. 41 shows a structure where the apparatus in this embodiment is assembled. The fan 15 of the blower 14 is integrally connected to a rotating shaft 16$a$ of the motor 16, and next inserted into the scroll casing 17 formed integrally with the resin lower case 29$a$. In this condition, the motor 16 is fixedly mounted at its flange portion 16$b$ to the scroll casing 17.

The evaporator 21 is placed on an mounting surface of the lower case, 29$a$, and a resin intermediate case 29$b$ is put on the lower case 29$a$ so as to sandwich the evaporator 21. Thus, the evaporator 21 is fixed between the lower case 29$a$ and the intermediate case 29$b$.

An upper cover portion 17$a$ of the scroll casing 17 is formed integrally with the intermediate case 29$b$. The upper cover portion 17$a$ has the bellmouth shaped air inlet 18. The internal air/external air selector housing 11 is located on the bellmouth shaped air inlet 18 and integrally mounted thereto.

The heater core 22 and the hot water control valve 24 are placed on a mounting surface of the intermediate case 29'$b$, and a resin upper case 29$c$ of resin is put on the intermediate case 29$b$ so as to sandwich the heater core 22 and the hot water control valve 24. Thus, the heater core 22 and the hot water control valve 24 are fixed between the intermediate case 29$b$ and the upper case 29$c$.

The upper case 29$c$ is provided with the blow mode selector 23, center face air passage 25, side face air passages 26, foot air passages 27, and defroster air passage 28. Further, the rotary door (not shown) is incorporated in the upper case 29$c$. The cases 29$a$, 29$b$, and 29$c$ and the internal air/external air selector housing 11 are detachably connected by using metal clips having elasticity or screws.

An operation of the thirteenth embodiment having the above structure will now be described.

Referring to FIGS. 39 and 40, the air flowing into the internal air/external air selector housing 11 is directed into the scroll casing 17 by the fan 15, and flows substantially horizontally in the scroll casing 17 to the lower side of the evaporator 21. Then, the air flow changes its direction to a vertical direction to enter the evaporator 21, and the air is dehumidified and cooled in the evaporator 21. Then the air flows upward to enter the heater core 22, in which the air is heated.

In this embodiment, the hot water control valve 24 for controlling the amount of hot water to be supplied to the heater core 22 is used as conditioned air temperature control means. That is, a so-called flow control reheat system is adopted to obtain a desired blowing air temperature by controlling the amount of hot water in the hot water control valve 24. The conditioned air reheated to a desired temperature in the heater core 22 is distributed to a predetermined air passage selected by the rotary door of the blow mode selector 23 in the upper case 29$c$, and is discharged from the predetermined air outlet into the passenger compartment.

With the above configuration of the embodiment, the following effects can be obtained.

(1) Since the evaporator 21 and the heater core 22 are located substantially horizontally and laminated vertically (one above the other), a vertical space for the heat exchanger can be greatly reduced. As a result, the vertical dimension of the air conditioning unit can be made sufficiently smaller than that of the conventional center-layout unit. Further, since it is unnecessary to provide blowing ducts on the front and rear sides of the heat exchanger, the dimension in the longitudinal direction of the vehicle can also be reduced. Thus, the air conditioning unit can be made greatly compact, and it can be easily installed in the passenger compartment.

(2) Since most of the components of the air conditioning unit have such shapes as to be assembled vertically as shown in FIG. 41, the air conditioning unit can be easily assembled by one-directional assembling such that the components are vertically laminated, so that the number of the assembling steps can be reduced.

(3) Since the evaporator 21 is inclined downward at its one end corresponding to the forward end of the flow of air directed from the blower 14, and the tubes 21b of the evaporator 21 extend along the air flow (in the width direction in FIGS. 39 and 40), the condensed water in the evaporator 21 can be forced by the air flow to smoothly flow on the surfaces of the tubes 21b and be collected at the end of the inclined evaporator 21 (the right end in FIGS. 39 and 40).

Then, the condensed water is discharged from the drain pipe 30 located below the lower end of the inclined evaporator 21. Thus, the condensed water can be smoothly discharged from the evaporator 21.

(4) Since the condensed water in the evaporator 21 is dropped to the upstream side thereof, the condensed water dropped is warmed by the hot air before cooled. Accordingly, the temperature of the outer surface of the lower case 29a is not so reduced, so that droplet on the lower case 29a can be greatly reduced or eliminated. Accordingly, it is unnecessary to provide a heat insulator usually mounted inside a case.

(5) By setting the direction of inclination of the louver 21j of the corrugated fin 21c in the evaporator 21, the air blow speed distribution of air passed through the evaporator 21 can be uniformed. An operation of uniformity of the air blow speed distribution by utilizing the inclination of the louver 21j, which is the main feature of the present invention, will be described.

Figure 44A:
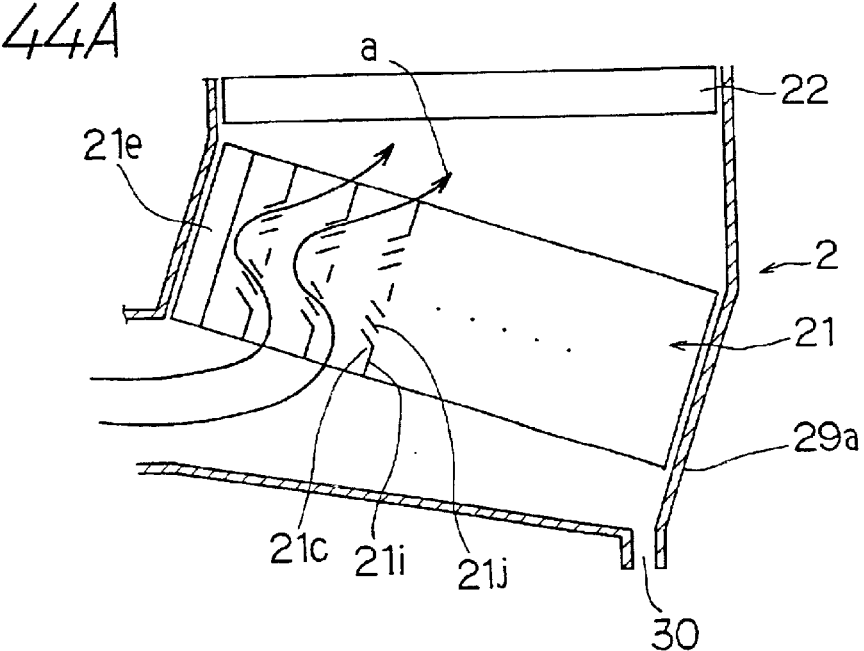
FIG. 44A is a perspective view showing a main portion of a comparison sample.
Figure 44B:
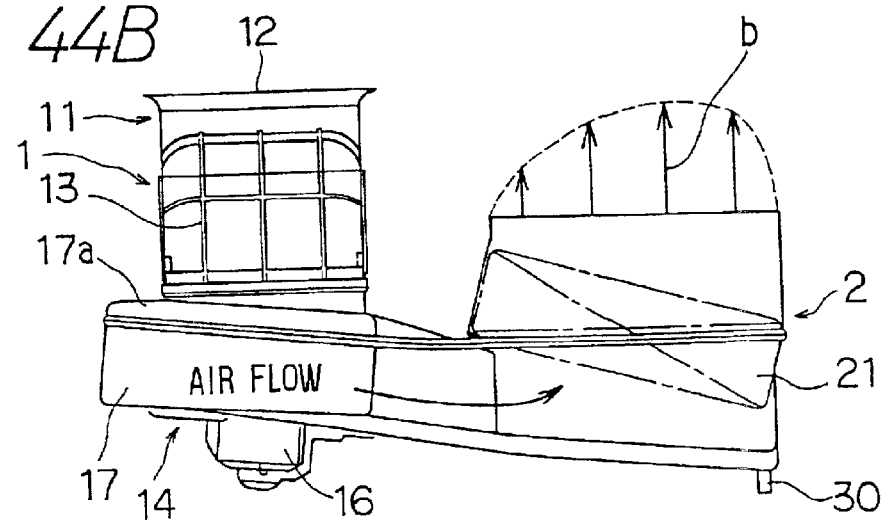
FIG. 44B is a front view showing a main portion of air blow speed distribution in a comparison sample.

FIG. 44A and 44B show a comparison sample on which the inventors have experimented for the air blow speed distribution. The air from the blower 14 is directed substantially horizontally so as to reach the lower side of the evaporator 21, and then flows through the evaporator 21 from the lower side to the upper side while its direction is changed from the substantially horizontal direction to the substantially vertical direction. In this way, as accompany with the air flow being bent, a main stream of the air flow is directed toward one end of the evaporator 21 corresponding to the forward end of the air flow (the right side in FIG. 44A) by the inertia of the air flow. In addition, since the evaporator 21 is inclined downward at this one end, the flat surface 21i of the corrugated fin 21 is not vertical, but is inclined toward this one end of the evaporator 21. As a result, it becomes easy for the air having passed through the evaporator 21 to be directed toward the side of this one end of the evaporator 21 (the right side in FIG. 44A).

In the comparison sample shown in FIGS. 44A and 44B, the direction of inclination of the louver 21j of the corrugated fin 21c is set so that the air is directed toward the right side in FIG. 44A. Accordingly, the air having passed through the evaporator 21 is directed along the inclination of the louver 21j toward the side of the one end of the evaporator 21 (the right side in FIG. 44A) as shown by the arrows a in FIG. 44A.

As a result, the air blow speed of air having passed through the evaporator 21 becomes higher on the side of the one end of the evaporator 21 than on the side of the other end of the evaporator 21 (the side of the tank portion 21e) as shown by the arrows b in FIG. 44B. Thus, variations in the air blow speed distribution becomes large.

Figure 45A:
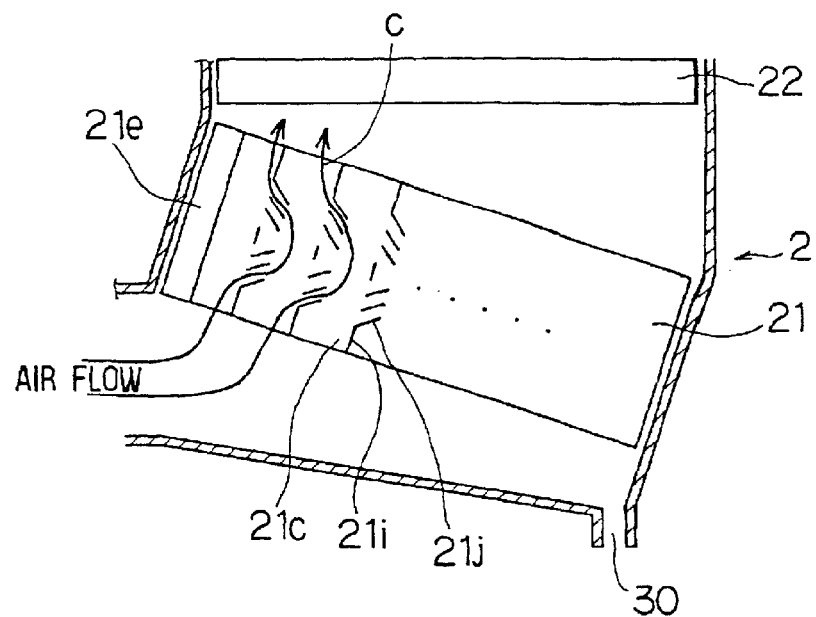
FIG. 45A is a perspective view showing a main portion of the thirteenth embodiment.

To the contrary, according to the air conditioning unit 2 in this embodiment, the direction of inclination of the louver 21j of the corrugated fin 21c is set so that the air is directed toward the left side in FIG. 45A (toward the side of the tank portion 21e). Accordingly, the air having passed through the evaporator 21 is directed along the inclination of the louver 21j toward the side of the other end of the evaporator 21 (the left side in FIG. 45A) as shown by the arrows c in FIG. 45A.

Figure 45B:
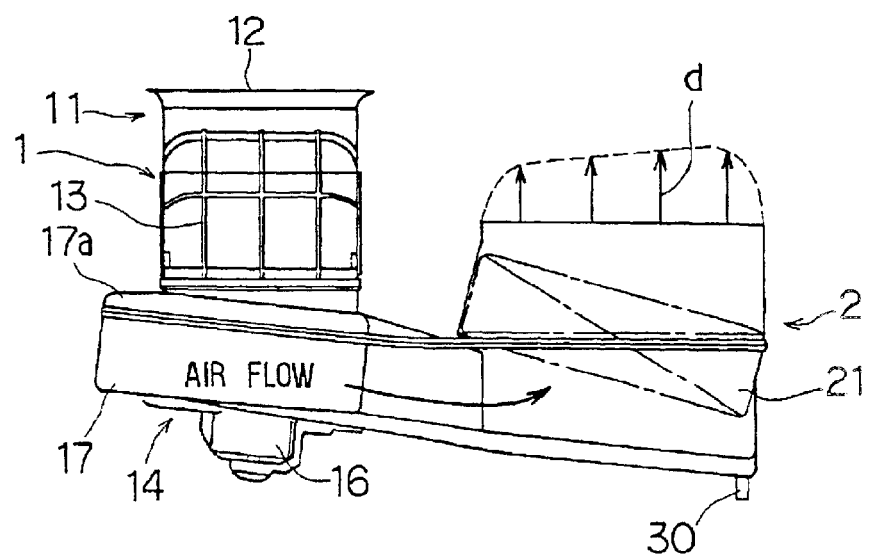
FIG. 45B is a front view showing a main portion of air blow speed distribution in the thirteenth embodiment.

As a result, although this embodiment adopts such a layout that the air flow is changed in its direction from the substantially horizontal direction to the substantially vertical direction before entering the evaporator 21 and that the evaporator 21 is inclined downward at its one end corresponding to the forward end of the air flow, the air blow speed of air having passed through the evaporator 21 can be made substantially. uniform in the width direction of the vehicle as shown by the arrows d in FIG. 45B. Thus, variations in the air blow speed distribution can be remarkably reduced.

(Embodiment 14)

Figure 46:
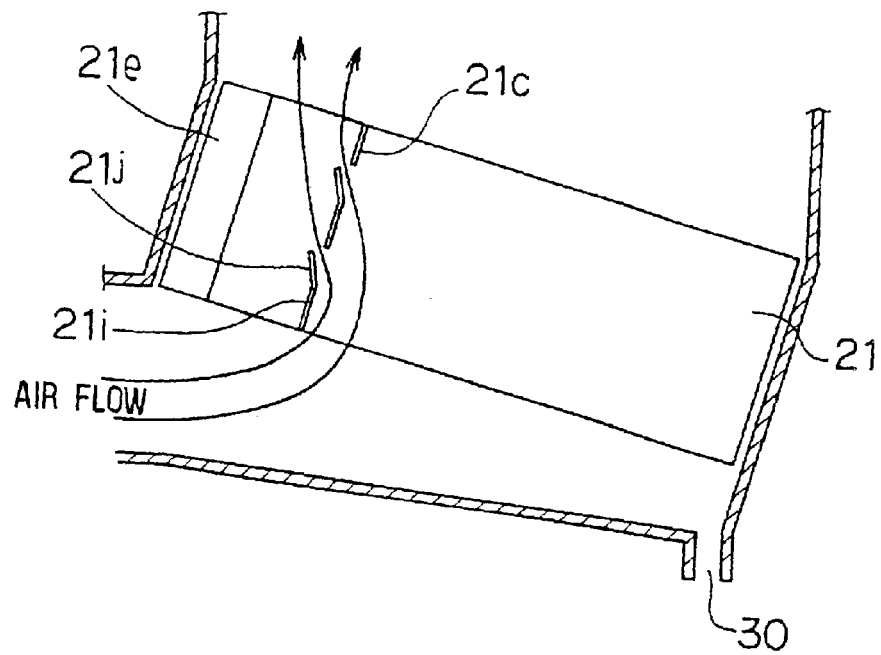
FIG. 46 is a sectional view showing a main portion of a fourteenth embodiment.

FIG. 46 shows a fourteenth embodiment of the present invention. In this embodiment, the direction of inclination of the louver 21j of the corrugated fin 21c is not reversed between on the upstream side of the flat surface 21i and on the downstream side thereof, but the direction is set to the same direction toward the tank portion 21e. The other configuration is the same as that of the thirteen embodiment.

(Embodiment 15)

Figure 47:
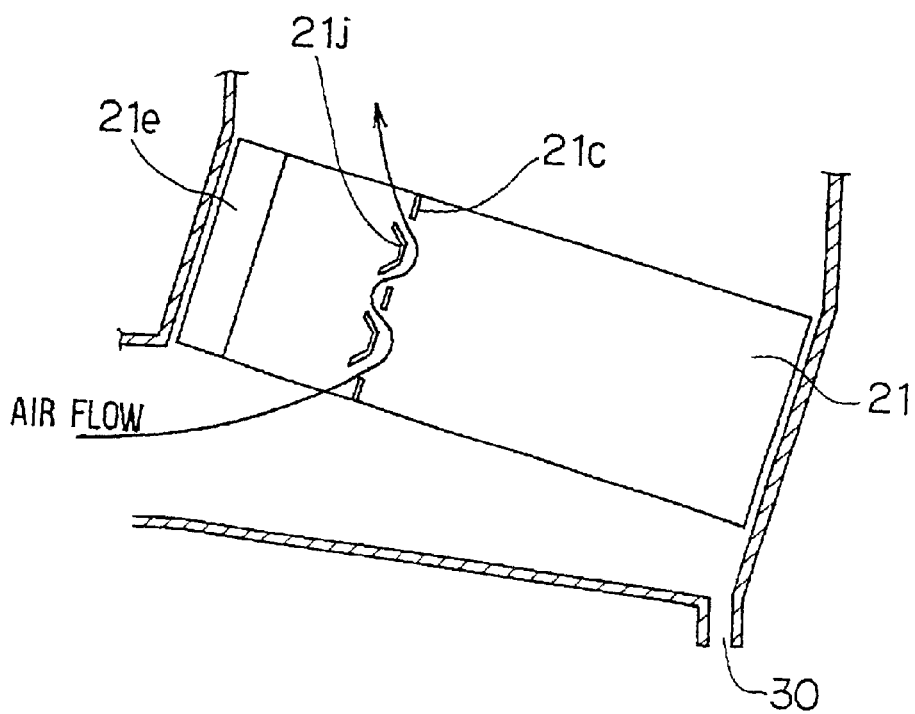
FIG. 47 is a sectional view showing a main portion of a fourteenth embodiment.

FIG. 47 shows a fifteenth embodiment of the present invention. In this embodiment, each louver 21j has adjacent portions inclined in adverse directions, so that the air passes through the corrugated fin 21c meanderingly. Also in this embodiment, the direction of inclination of the louver 21j on the most downstream side is set so that the air is directed toward the side of the tank portion 21e. Accordingly, the air blow speed distribution of air having passed through the evaporator 21 can be uniformed.

The evaporator 21 is not limited to the aforementioned laminated type, but any other types may be adopted. For example, the evaporator 21 may be of a serpentine type in which a multihole flat tube is meanderingly bent and a corrugated fin is combined with the bent tube.

Having thus described some specific embodiments of the present invention applied to an air conditioner for an automobile, it is to be noted that the application of the present invention is not limited to an air conditioner for an automobile, but the present invention may be applied to any heat exchanger for air conditioning having a layout such that an air passage is bent across the heat exchanger.

Although the present invention has been fully descried in connection with the preferred embodiments thereof with reference to the accompanying drawings, it is to be noted that various changes and modifications are to be understood as being included within the scope of the present invention as defined in the appended claims.

What is claimed is:

1. An air conditioner for a vehicle having a passenger compartment, the air conditioner comprising:

a blower unit for blowing air, said blower unit being disposed in the passenger compartment at a position offset from a center of an instrument panel in a vehicle width direction; and an air conditioning unit, for adjusting an air state to be blown into the passenger compartment, said air conditioning unit being disposed generally at the center of the instrument panel at a downstream air side of said blower unit, said air conditioning unit including:

a case forming an air passage through which air blown by said blower unit flows into the passenger compartment, said case having a first opening for blowing air toward an upper side of the passenger compartment, and a second opening for blowing air toward a lower side of the passenger compartment, a cooling heat exchanger for cooling air, said cooling heat exchanger being disposed within said case approximately horizontally to form a space under said cooling heat exchanger in said case, in such a manner that air from said blower unit is introduced into said space approximately horizontally and passes through said cooling heat exchanger from below upwardly, a heating heat exchanger for heating air from said cooling heat exchanger, said heating heat exchanger being disposed approximately horizontally at an upper side of said cooling heat exchanger to heat air from said cooling heat exchanger so that a temperature of air to be blown into said first opening and said second opening is adjusted, a mode switching member, disposed at a downstream air side of said heating heat exchanger, for selectively opening and closing said first opening and said second opening, and a drain opening in direct communication with said space in said case through which condensed water generated by said cooling heat exchanger is discharged to an outside of said case, said drain opening being provided in said case at a most bottom position of said case directly under a lower side surface of said cooling heat exchanger on an upstream air side of the lower side surface, wherein:

said cooling heat exchanger is tilted relative to a horizontal surface;

said cooling heat exchanger includes a plurality of tubes disposed in parallel with each other and a plurality of corrugated fins each of which is disposed between adjacent tubes;

said case has an air inlet disposed in a substantially vertical direction from which said air blown by said blower unit is introduced into said space under said cooling heat exchanger in a generally horizontal direction;

said air inlet is provided in said case at a position approximately directly under an upper end portion of said cooling heat exchanger adjacent said blower unit;

said blower unit includes an inside/outside air switching portion for introducing air, and a blower having a fan for blowing said air introduced from said inside/outside air switching portion and a motor for rotating said fan;

a rotation axis of said fan is in the substantially vertical direction;

said inside/outside air switching portion is provided above said fan;

the vehicle has a partition plate for partitioning the passenger compartment and an engine compartment from each other;

the cooling heat exchanger is arranged adjacent to the partition plate;

the air conditioner further comprises a refrigerant pipe member through which refrigerant is introduced into and discharged from a heat exchanging portion of the cooling heat exchanger, and the refrigerant pipe member protrudes toward the engine compartment from a side surface of the cooling heat exchanger which is adjacent to the partition plate; and the refrigerant pipe member penetrates through the partition plate and protrudes into the engine compartment when being mounted on the vehicle.

2. The air conditioner according to claim 1, wherein said drain pipe is provided at a position under a tilted lower end of said cooling heat exchanger.

3. The air conditioner according to claim 1, wherein said tubes are disposed to extend in a direction approximately parallel to an introduction direction of said air being introduced into said space.

4. The air conditioner according to claim 1 wherein:
said cooling heat exchange is tilted relative to the horizontal surface by a tilt angle; and
said angel tilt is in a range of 10°–30°.

5. The air conditioner according to claim 1, wherein said space is provided such that said air blown by said blower unit is introduced into said space approximately horizontally in said vehicle width direction.

6. The air conditioner according to claim 1, wherein said heating heat exchanger has one end that is disposed adjacent a tilted top end portion of said cooling heat exchanger.

7. The air conditioner according to claim 1, wherein the cooling heat exchanger further includes an expansion valve for expanding refrigerant flowing into the heat-exchanging portion, the expansion valve is provided in the passenger compartment between the heat exchanging portion in the cooling heat exchanger and the refrigerant pipe member.

8. The air conditioner according to claim 7, wherein the expansion valve abuts the partition plate through a sealing member.

9. The air conditioner according to claim 1, wherein the refrigerant pipe member extends from the side surface of the cooling heat exchanger to be approximately perpendicular to a surface of the partition plate.

10. An air conditioner for a vehicle having a passenger compartment, said air conditioner comprising:

a case forming an air passage;

a blower unit for blowing air, said blower unit being disposed at a first side of said case;

a cooling heat exchanger for cooling air, said cooling heat exchanger extending generally horizontally within said case to define a first end adjacent said blower unit and a second end adjacent a second side of said case, said second side of said case being opposite to said first side of said case, said second end of said cooling heat exchanger being lower than said first end of said cooling heat exchanger, said cooling heat exchanger defining a space between said case and said cooling heat exchanger, said blower unit blowing air into said space in a direction from said first end to said second end of said cooling heat exchanger, said blown air passing through said cooling heat exchanger upwardly from said space;

a heating heat exchanger for heating said blown air from said cooling heat exchanger, said heating heat exchanger being disposed generally horizontal at an upper side said cooling heat exchanger;

a drain opening in direct communication with said space in said case through which condensed water generated by said cooling heat exchanger is discharged outside of said case, said drain opening being disposed at said second side of said case opposite to said blower unit adjacent said second end of said cooling heat exchanger; wherein:

said case has an air inlet disposed in a substantially vertical direction from which said air blown by said blower unit is introduced into said space under said cooling heat exchanger in a generally horizontal direction;

said air inlet is provided in said case at a position approximately directly under said first end of said cooling heat exchanger;

said blower unit includes an inside/outside air switching portion for introducing air, and a blower having a fan for blowing said air introduced from said inside/outside air switching portion and a motor for rotating said fan;

a rotation axis of said fan is in the substantially vertical direction;

said inside/outside air switching portion is provided above said fan;

said blower unit is disposed such that air blown from said fan is approximately horizontally introduced into said space through said air inlet;

the vehicle has a partition plate for partitioning the passenger compartment and an engine compartment from each other;

the cooling heat exchanger is arranged adjacent to the partition plate;

the air conditioner further comprises a refrigerant pipe member through which refrigerant is introduced into and discharged from a heat exchanging portion of the cooling heat exchanger, and the refrigerant pipe member protrudes toward the engine compartment from a side surface of the cooling heat exchanger which is adjacent to the partition plate; and the refrigerant pipe member penetrates through the partition plate and protrudes into the engine compartment when being mounted on the vehicle.

11. The air conditioner according to claim 10, wherein said heating heat exchanger has one end that is disposed adjacent tilted top end portion of said cooling heat exchanger.

12. The air conditioner according to claim 10, wherein the cooling heat exchanger further includes an expansion valve for expanding refrigerant flowing into the heat-exchanging portion, the expansion valve is provided in the passenger compartment between the heat exchanging portion in the cooling heat exchanger and the refrigerant pipe member.

13. The air conditioner according to claim 12, wherein the expansion valve abuts the partition plate through a sealing member.

14. The air conditioner according to claim 10, wherein the refrigerant pipe member extends from the side surface of the cooling heat exchanger to be approximately perpendicular to a surface of the partition plate.

* * * * *